US 6,575,066 B2

(12) United States Patent
Arasmith

(10) Patent No.: US 6,575,066 B2
(45) Date of Patent: Jun. 10, 2003

(54) METHOD AND APPARATUS FOR REDUCING OVERSIZED WOOD CHIPS

(76) Inventor: Stanley D. Arasmith, 5146 Big Texas Valley Rd., P.O. Box 2458, Rome, GA (US) 30164

( * ) Notice: Subject to any disclaimer, the term of this patent is extended or adjusted under 35 U.S.C. 154(b) by 7 days.

(21) Appl. No.: 09/805,754

(22) Filed: Mar. 13, 2001

(65) Prior Publication Data

US 2002/0062881 A1 May 30, 2002

Related U.S. Application Data

(60) Provisional application No. 60/202,721, filed on May 8, 2000, and provisional application No. 60/189,317, filed on Mar. 14, 2000.

(51) Int. Cl.[7] .............................. B26D 7/06; B27L 7/00
(52) U.S. Cl. .................... 83/425.3; 83/435.11; 83/407; 144/2.1; 144/162.1; 144/163; 144/180; 144/242.1; 144/245.1; 144/356; 144/382; 144/402; 241/282
(58) Field of Search .................. 83/407, 425, 425.3, 83/431, 435, 435.11, 435.14, 435.15, 435.16, 477.2, 714, 715; 144/180, 162.1, 163, 242.1, 245.1, 2.1, 370, 356, 382, 394, 402; 241/282

(56) References Cited

U.S. PATENT DOCUMENTS

| | | | |
|---|---|---|---|
| 2,323,760 A | * | 7/1943 | Wolfinger, Sr. .......... 83/435.15 |
| 2,361,147 A | * | 10/1944 | Nordstrom ................ 83/425.3 |
| 3,195,594 A | | 7/1965 | Bloomquist et al. |
| 3,688,997 A | | 9/1972 | Ullner |
| 3,690,568 A | | 9/1972 | Alexander |
| 4,205,570 A | * | 6/1980 | Soodalter ................ 83/425.3 |
| 4,206,672 A | * | 6/1980 | Smith .................... 83/435.11 |
| 4,207,653 A | * | 6/1980 | Gasbarro ................ 83/425.3 |
| 4,305,590 A | | 12/1981 | Haikkala et al. |
| 4,444,234 A | | 4/1984 | Arasmith |
| 4,569,380 A | | 2/1986 | Arasmith |
| 4,595,150 A | | 6/1986 | Aario |
| 4,697,626 A | | 10/1987 | Arasmith |
| 4,776,375 A | | 10/1988 | Arasmith |
| 4,785,860 A | | 11/1988 | Arasmith |
| 4,829,865 A | * | 5/1989 | Nunnery et al. ........... 83/425.3 |
| 4,874,024 A | | 10/1989 | Arasmith |
| 5,070,918 A | | 12/1991 | Pallman |

FOREIGN PATENT DOCUMENTS

GB          16931          of 1890

* cited by examiner

*Primary Examiner*—W. Donald Bray
(74) *Attorney, Agent, or Firm*—Alston & Bird LLP

(57) ABSTRACT

An apparatus is provided for cutting oversized wood chips smoothly and uniformly, such that the resulting chips are of optimum size and shape for use in making paper, cardboard, and other recyclable materials. A method is provided for aligning and guiding oversized wood chips through an array of spaced-apart saw blades using a reciprocating plunger controlled to continuously align and sweep the wood chips completely through the saw blades. The method and apparatus can be adapted to produce a variety of desired wood chip sizes.

42 Claims, 12 Drawing Sheets

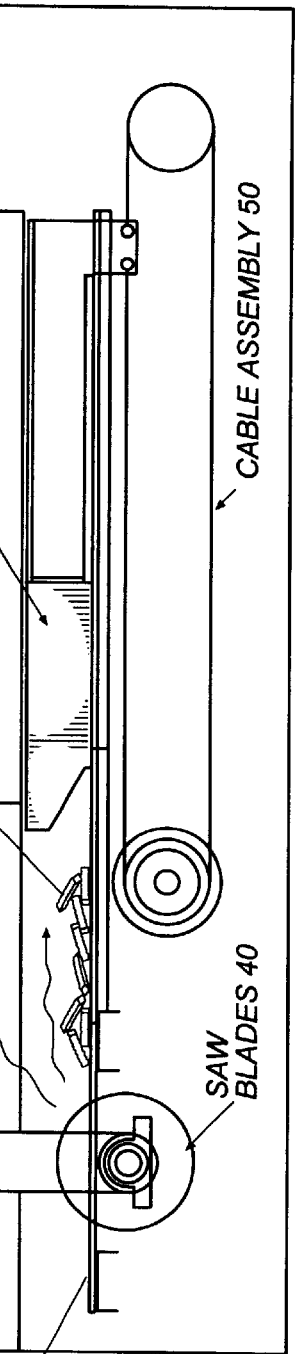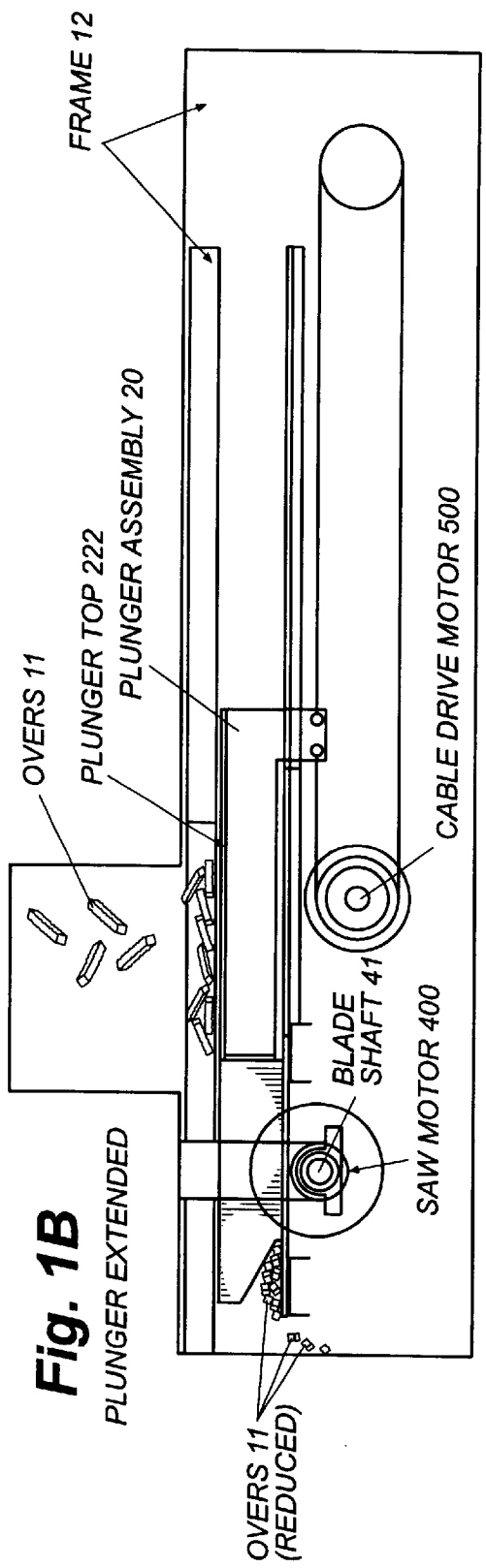

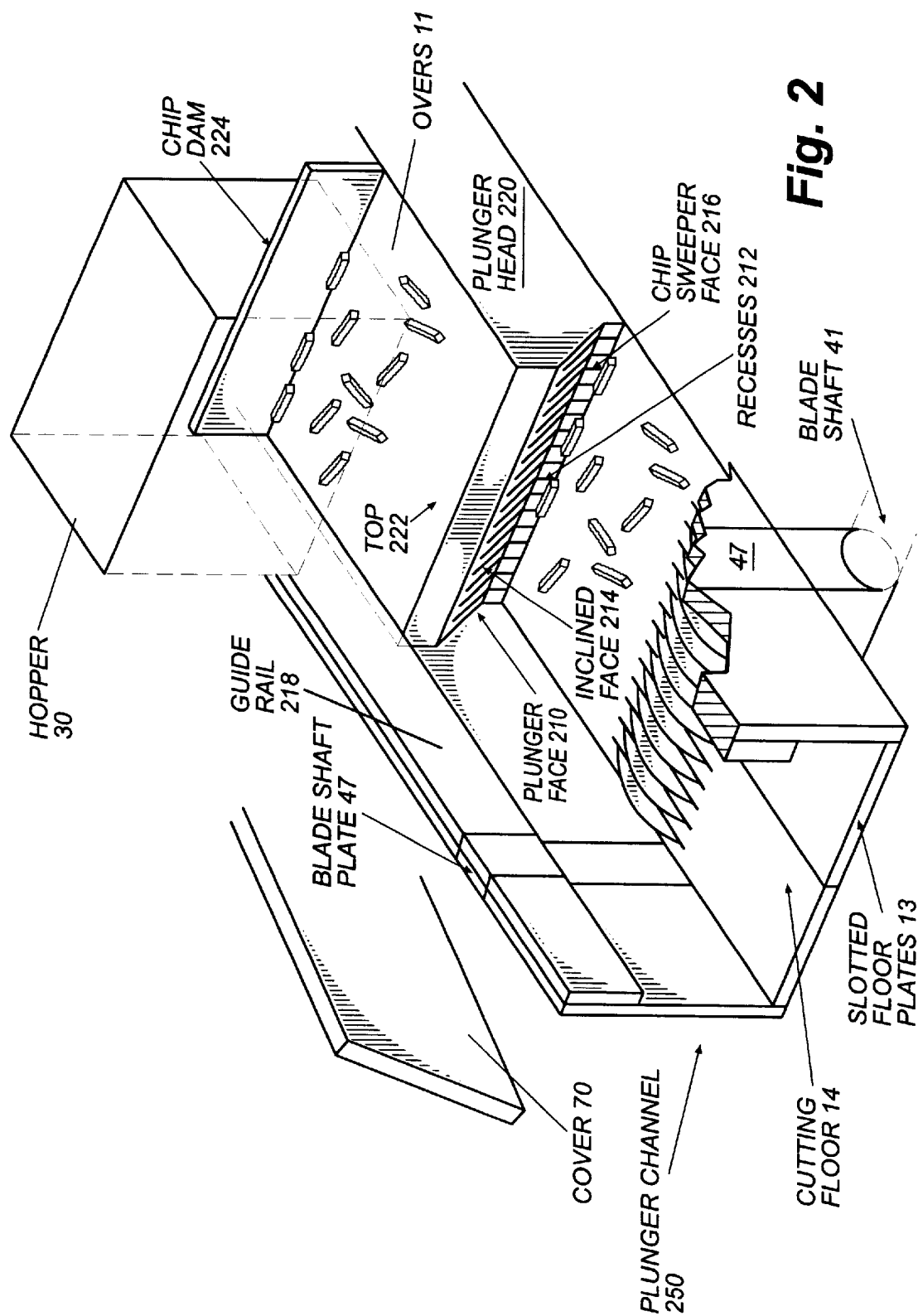

ALTERNATE EMBODIMENT 700

OVERS 11

SAW BLADES 40

FEEDER ASSEMBLY 720

SLOT 212

CHIP SWEEPER FACE 216

METHOD AND APPARATUS FOR REDUCING OVERSIZED WOOD CHIPS

RELATED APPLICATIONS

This application claims the benefit and priority of pending Provisional Application Serial No. 60/189,317, filed Mar. 14, 2000, and pending Provisional Application Serial No. 60/202,721, filed May 8, 2000, both of which are incorporated herein by reference.

TECHNICAL FIELD

The present invention relates generally to the field of wood processing. More particularly, the present invention relates to a method and apparatus for reducing oversized wood chips.

BACKGROUND OF THE INVENTION

Wood processing mills generate wood scraps of various sizes during the wood cutting process. In plywood processing mills, the wood scraps can be in the form of thin, elongate, veneer-like strips that can be generally in the range of six inches to twenty-four inches long, two to six inches wide, and one eighteenth of an inch thick. It should be understood that such dimensions are provided for example only and should not be construed as limiting the present invention. Likewise, any dimensions discussed herein are for example purposes only and should not be construed as a limitation on the present invention. To be useful in the manufacture of paper, cardboard, and other recyclable materials, wood scraps must be reduced into wood chips of an acceptable size and shape.

Mills use screens to separate acceptable wood chips from oversized wood chips. The oversized wood chips are sometimes referred to as "overs" because they pass over the separating screens.

There is a need for a machine to reduce the overs to an acceptable size. More specifically, the overs need to be reduced to wood chips that are relatively uniform in size, having gross dimensions of one inch or less, without crushing the overs into unusable bits. It should be understood that the desired chip dimension of one inch is provided as an example only and should not be construed as limiting the present invention. Many different machines have been tried, such as disc chippers, hogs, drum chippers, and the like, with very little success in producing usable chips. Overs are generally long, thin, and lightweight. The known machines use a high-impact method which tends to crush the overs into finer slivers and particles that are unacceptable for later use in making paper and cardboard.

The need to reduce overs to an acceptable and useful size without destroying them is a problem which has existed since the beginning of saw mills, veneer mills, and other wood working facilities.

SUMMARY OF THE INVENTION

The above and other needs are met by the present invention which, in one embodiment, provides an apparatus and a method for reducing certain oversized wood chips known as "overs" by cutting them smoothly, with relatively no impact, such that the resulting chips can be used to make paper, cardboard, and other recyclable materials.

Generally described, the present invention in one embodiment comprises a table saw with an array of spaced-apart circular saw blades and a reciprocating plunger to sweep the overs through the saw blades. The face of the plunger is shaped to align the overs in the optimum orientation for cutting and is also shaped to hold the overs in place during cutting.

In one aspect of the invention, the apparatus includes a frame, a saw assembly including an array of blades, a moveable plunger, and a plunger actuator. The face of the plunger contains an array of recesses located and sized to accept insertion of the array of saw blades. The plunger moves from a first position to a second position. In the first position, the plunger is disengaged from the array of blades. In the second position, the plunger is engaged with the array of blades such that the blades are at least partially inserted in the recesses in the face of the plunger. As the plunger moves from the first position to the second position, the plunger sweeps the wood chips into the array of saw blades and beyond their cutting edges.

In one preferred embodiment, the saw assembly includes an array of circular saw blades mounted on a common shaft releasably coupled to a saw motor. The overs are swept into the gaps between the circular saw blades which are maintained by spacers. For easy removal and replacement, the entire shaft may be uncoupled from the saw motor and lifted out of the assembly.

In another aspect of the invention, the frame of the apparatus includes a channel having a floor, side walls, and a plurality of floor slots through which the array of saw blades protrudes. The plunger is configured to move back and forth within the channel as it sweeps the wood chips into the array of saw blades.

In one preferred embodiment of the invention, the plunger face includes a planar portion and an overhanging portion. The planar portion aligns the overs parallel to the plunger face for cutting as the plunger moves toward the blades. The overhanging portion is shaped to hold the overs in place during cutting by resisting the turning force of the saw blades. The apparatus further includes a chip dam located above the plunger to align the overs parallel to the plunger face as the plunger retracts away from the blades.

In one preferred embodiment, the plunger actuator includes a motor and a drive assembly to move the plunger. The drive assembly may include sensors and a controller in communication with the sensors to monitor the plunger position and control its movement. The drive assembly may consist of a pair of cables mounted on a cable spool connected to a motor. The pair of cables may be attached to the keel of the plunger and supported by an idler pulley to convert the rotational movement of the spool into translational movement of the plunger.

In one alternative embodiment, the apparatus includes a frame, an an array of circular blades driven by a motor, a feeder assembly, and an actuator for rotating the feeder assembly. The feeder assembly includes a number of paddles attached to a central hub. The feeder assembly is mounted on the frame near the saws to permit the intersection of the paddles and the saw blades. The paddles include an array of slots that match the saw blades. In one preferred arrangement of this embodiment, the paddles include a flat portion near the hub and a contoured outer portion near the ends of each paddle. The contoured portion of each paddle is sized to capture an incoming flow of wood chips, shaped to align the wood chips parallel to the axis of rotation of the hub, and positioned to guide the wood chips into and completely through the saw blades.

In another aspect of the invention, the method comprises the steps of providing a moveable plunger and a saw assembly for the cutting the overs, and moving the plunger from a first position to a second position, as described above. The step of moving the plunger sweeps the wood chips into the array of saw blades and beyond their cutting edges.

In one preferred embodiment, the method of the present invention includes the preliminary steps of attaching a blank plunger face, without recesses, to the moveable plunger when it is disengaged from the saws. By moving the blank plunger face slowly into the saws, the array of saw blades cut a matching array of recesses into the plunger face. This preliminary method step assures a matching fit between the saw blades and the recesses.

In one preferred embodiment, another aspect of the method includes the step of aligning the wood chips to be roughly parallel to the plunger face before cutting. This step may be performed by a planar portion of the plunger face as the plunger moves toward the saw blades. In another aspect, the method may include the step of containing the wood chips during cutting by using an overhanging portion of the plunger face. In another aspect, as the plunger moves away from the saw blades, a chip dam mounted above the plunger may perform the step of aligning the wood chips to be roughly parallel to the plunger face.

Therefore, it is an object of the present invention to provide an improved wood processing apparatus.

It is a further object of the present invention to provide an improved wood processing method.

It is a further object of the present invention to provide an improved method of processing wood chips which is efficient in operation.

It is a further object of the present invention to provide an improved method of processing wood chips which is simple in operation.

It is a further object of the present invention to provide an improved method of processing wood chips which is effective in providing proper chip size.

It is a further object of the present invention to provide an improved apparatus of processing wood chips which is efficient in operation.

It is a further object of the present invention to provide an improved apparatus of processing wood chips which is simple in operation.

It is a further object of the present invention to provide an improved apparatus of processing wood chips which is effective in providing proper chip size.

These and other objects, features, and advantages of the present invention will become apparent upon reading the following detailed description of a preferred embodiment of the invention when taken in conjunction with the drawing and the appended claims.

BRIEF DESCRIPTION OF THE DRAWINGS

FIGS. 1A and 1B are illustrative side elevations of the apparatus 10 according to the present invention, with FIG. 1A showing the reciprocating plunger assembly 20 in its retracted position and FIG. 1B showing the plunger assembly 20 in its extended position.

FIG. 2 is a pictorial, partial illustration of the apparatus 10 according to the present invention, which shows the plunger assembly 20 within the plunger channel 250 as it slides along the cutting floor 14 toward a plurality of saw blades 40 extending upward through slotted floor plates 13.

FIG. 8 also includes a cross-sectional view of the blade shaft 41. The saw blades 40 may include a saw blade key 44 to provide an interlocking relationship with a blade shaft key slot 46 on the blade shaft 41. The spacers 45 shown are not keyed.

DETAILED DESCRIPTION OF THE PREFERRED EMBODIMENT

Figure 3A:
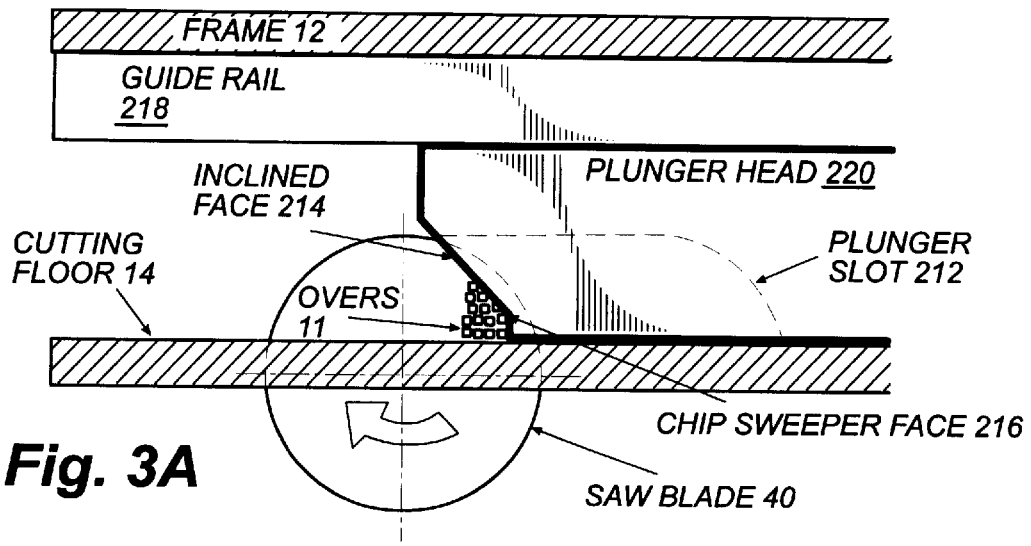
FIGS. 3A, 3B, and 3C are illustrative side views showing the progressive engagement of the plunger assembly 20 into and through the saw blades 40.

Reference will now be made to the drawings, in which like numerals indicate like elements throughout the several views.

General Construction and Operation

Generally described, the apparatus 10 according to the present invention is configured to reduce oversized wood chips known as "overs" 11 by cutting them smoothly, with relatively no impact, such that the resulting smaller chips can be used to make paper, cardboard, and other recyclable materials.

Referring now to FIGS. 1A and 1B, generally, overs 11 enter the apparatus 10 through a hopper 30 and drop onto a cutting floor 14. A reciprocating plunger assembly 20 slidably mounted within frame 12 pushes or "sweeps" the overs 11 toward a plurality of high-speed circular saw blades 40 extending partially through the cutting floor 14. The face 210 of the plunger assembly 20 is sized and shaped to guide the overs 11 through the saw blades 40 in a manner that tends to provide a smooth cut without crushing the overs 11. The plunger assembly 20 then retracts to a position behind the hopper 30 and is ready to sweep another batch of overs 11 toward the saw blades 40.

FIG. 1A depicts the overs 11 falling onto the cutting floor 14 in front of the plunger assembly 20, which is shown in its retracted position. FIG. 1B shows the plunger assembly 20 in its extended position after it has pushed the overs 11 through the saw blades 40. When the plunger assembly 20 is in its extended position, as shown in FIG. 1B, the overs 11 collect on the top 222 of the plunger assembly 20 and are oriented during the backstroke of the plunger assembly as discussed elsewhere.

In one preferred embodiment, a plurality of spaced-apart high-speed circular saw blades 40 are mounted on a common horizontal blade shaft 41 which is driven by saw motor 400, as shown in FIG. 1B. The plunger assembly 20 is moved along a linear, reciprocating path toward and away from the saw blades 40 by a cable assembly 50 which is driven and controlled by cable drive motor 500.

FIG. 2 is a pictorial view of the plunger assembly 20 in an intermediate position between its fully retracted position and its fully extended position. The foreground wall of frame 12 is cut away to reveal the plunger assembly 20 in relation to the saw blades 40. At the open end of the plunger channel 250, the cutting floor 14 includes two side-by-side removable slotted floor plates 13 and a plurality of saw blades 40 extending upwardly through the slots. A guide rail 218 for the plunger assembly 20 is shown at the top of each side of the plunger channel 250. A removable blade shaft plate 47 is also shown, which allows for removal of blade shaft 41, shown in dotted line. A removable cover 70 is likewise shown, which can be used to cover the top of the sawing region while leaving a downstream opening for the cut chips to be pushed through and to later fall therefrom.

It should be understood, as shown in FIG. 2, that saw blades 40 extend into matching plunger recesses 212 in the face 210 of plunger head 220, which can be made of a high-density plastic material. In one preferred method, a blank plunger head 220 without recesses can be installed and actuated slowly forward such that the saw blades 40 cut the plunger recesses 212. Allowing the saw blades 40 to cut their own corresponding plunger recesses 212 assures a good fit that is tailored to match the precise orientation of the saw blades 40.

The Cutting Action and Orientation

In operation, overs 11 are continuously dropping into the apparatus 10 from the hopper 30. In one embodiment, this can be by use of a conveyor which also provides an orienting feature, or alternately by a batch process. As shown in FIGS. 1A, 1B and FIG. 2, overs 11 may drop either onto the cutting floor 14 or onto the top 222 of plunger head 220. In one aspect of the invention, the face 210 of the plunger head 220 is shaped to align the overs 11, sweep the overs 11 toward the saw blades 40, and push the overs 11 completely through the saw blades 40.

The plunger face 210 may include a flat face, a curved face, an inclined face, or any combination thereof that is suitable for the application. FIG. 2 shows one embodiment of the plunger face 210 of the present invention, which includes an inclined face 214 and a flat chip sweeper face 216 that slides atop the cutting floor 14. It should be noted that the inclined face 214 creates an overhanging area on the upper portion of the face 210 of the plunger head 220. It should be understood that the plunger face 210 may include a variety of shapes that are suited accomplish the needs of a particular application.

Importantly, the chip sweeper face 216 performs two functions. First, as the plunger assembly 20 moves toward the saw blades 40, the chip sweeper face 216 aligns the overs 11 such that at least some of the elongate overs tend to have their longitudinal axes roughly perpendicular to the plane of the saw blades 40. Such perpendicular alignment or orientation of the overs 11 tends to provide a cleaner, smoother cut by the saw blades 40 than would be possible otherwise. Second, the chip sweeper face 216 sweeps the overs 11 toward the saw blades 40 and guides them through the saw blades 40 during the cutting process.

FIG. 2 also shows a fixed chip dam 224 positioned atop the plunger top 222 such that the plunger top 222 slides underneath the chip dam 224. Like the chip sweeper face 216, the chip dam 224 also performs an alignment function. As the plunger assembly 20 retracts, moving away from the saw blades 40, the chip dam 224 tends to align the elongate overs 11 on the plunger top 222 such that each one is roughly perpendicular to the plane of the saw blades 40. When the plunger assembly 20 fully retracts, the overs 11 fall to the cutting floor 14. The perpendicular alignment of the overs 11 by the chip dam 224 is important because it serves as the initial preparation of the overs 11 in the proper alignment for cutting.

Figure 3B:
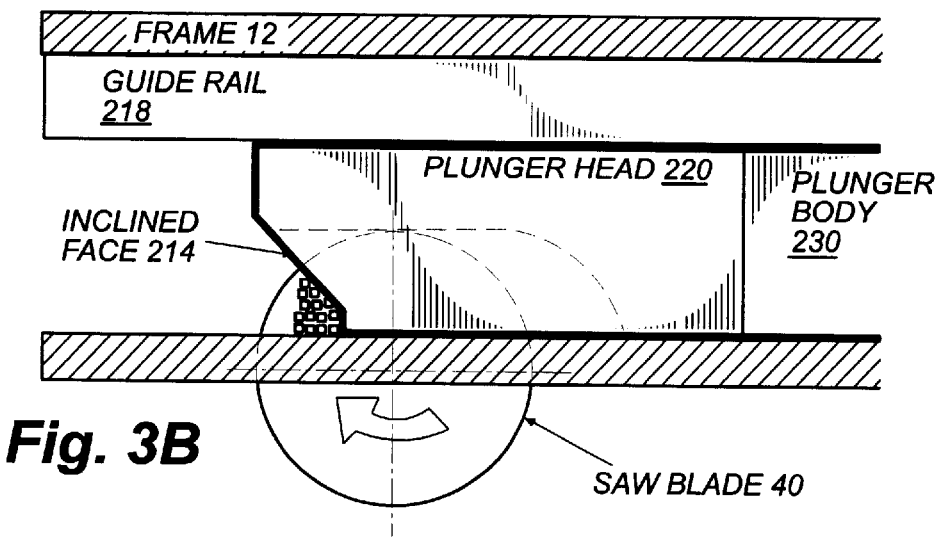
Figure 3C:
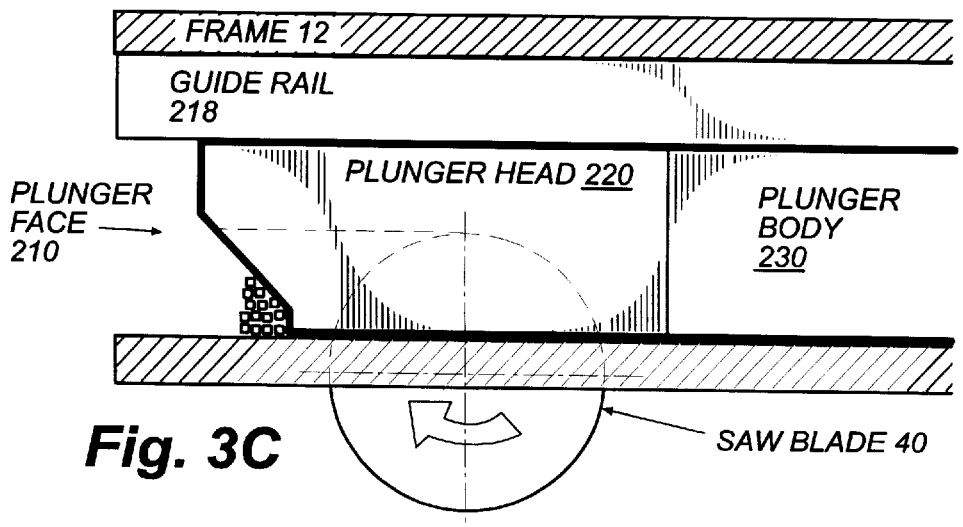

The shape of the plunger face 210 is shown in side view in FIGS. 3A, 3B, and 3C. FIG. 3A is a side view of the plunger head 220 as it engages the saw blades 40 and pushes through the overs 11. Plunger recesses 212 correspond to the initial cuts made by saw blades 40. It should be noted that the plunger face 210 is guiding the elongate overs 11 through the saw blades 40 such that the overs 11 will tend to be cut transversely across their longitudinal axes in order to shorten the overs 11 to a desirable length. Transverse cuts are better achieved because of the aligning action of the chip sweeper face 216, as discussed above and as shown in FIG. 2.

The cutting zone is defined as that volume of space bounded by the outermost edges of the plurality of saw blades 40. For circular saw blades, as shown in FIGS. 3A, 3B, and 3C, the saw blades 40 occupy a cylindrical space that surrounds and includes the saw blades 40 themselves, the spacers 45, and the gaps in between the saw blades 40. For band saws, jigsaws, or other non-circular types of saws, the saw blades 40 occupy a rectangular prismatic space that surrounds and includes the saw blades 40 themselves, the spacers if any, and the gaps in between the saw blades 40. In any particular embodiment, portions of the cutting zone may or may not intersect the plunger assembly 20. For example, referring to FIGS. 3A, 3B, and 3C, the cutting zone includes the entire cylindrical space occupied by the saw blades 40; however, the plunger assembly 20 only travels through the cutting zone in the area above the cutting floor 14.

Referring now to the plunger face 210 shown in FIG. 3A, the lowermost chip sweeper face 216 is flat and substantially vertical and perpendicular to the cutting floor 14. It should be noted that the saw blade 40 is rotating clockwise, and that the motion of the saw teeth relative to the overs 11 in FIG. 3A is generally downward. The vertical orientation of chip sweeper face 216 helps prevent wedging of the overs 11 between the plunger face 210 and the cutting floor 14 as the plunger assembly 20 advances into the saw blades 40. Thus, the chip sweeper face 216 performs the dual function of aligning the overs 11 before cutting and preventing wedging or jamming during cutting.

Referring now to FIG. 3B, it should be noted that the motion of the saw teeth relative to the overs 11 is now generally upward. The inclined face 214 creates an overhanging area on the upper portion of the plunger face 210. The overhanging shape of the plunger face 210, and the inclined face 214 in particular, helps contain the overs 11 while the force of the saw blades 40 against the overs 11 is generally upward.

In addition the contact forces exerted by the saw blades 40, it should be understood that the upward force of the saw blades 40 against the overs 11 includes a flow of air being generating by the rotating saw blades 40. This air flow, shown generally by arrows 260, provides its own orienting function, as overs 11 are blown by the air blast into the plunger face 210 of the approaching plunger assembly 20, as well as against the chip dam 224. Driven by this air flow, the overs 11 are blown against both the inclined face 214 and the chip sweeper face 216, where the overs 11 orient themselves relative thereto, in the proper alignment for transverse cutting. Thus, the air flow, in combination with the plunger face 210, provides an additional chip orienting function.

FIG. 3C shows the plunger head 220 at the ends of its stroke 240 where the saw blades 40 now completely fill the plunger recesses 212. It is important to note that the leading edge of the plunger face 210 has moved completely through and past the saw blades 40. The overs 11 are now clear of the saw blades 40 and, when the plunger assembly 20 retracts, the saw blades 40 may exert no more cutting forces on the overs 11. Clearing the overs 11 helps prevent further, unwanted reduction of the overs 11 such as chopping, crushing, and shredding, which would yield chips that are undesirable and unusable in the manufacture of paper, cardboard, and other recyclable materials.

The cleared overs 11 may accumulate on the cutting floor 14 downstream and beyond the reach of the saw blades 40 until such time as additional overs 11 are swept through and push the accumulated overs 11 off the edge of the cutting floor 14. It should be understood that, after running through the apparatus 10, the overs 11 are again sorted according to size. Any remaining overs 11 may be passed again through the apparatus 10 to be further reduced if they do not pass through an appropriate sizing screen or other suitable filter.

Figure 4:
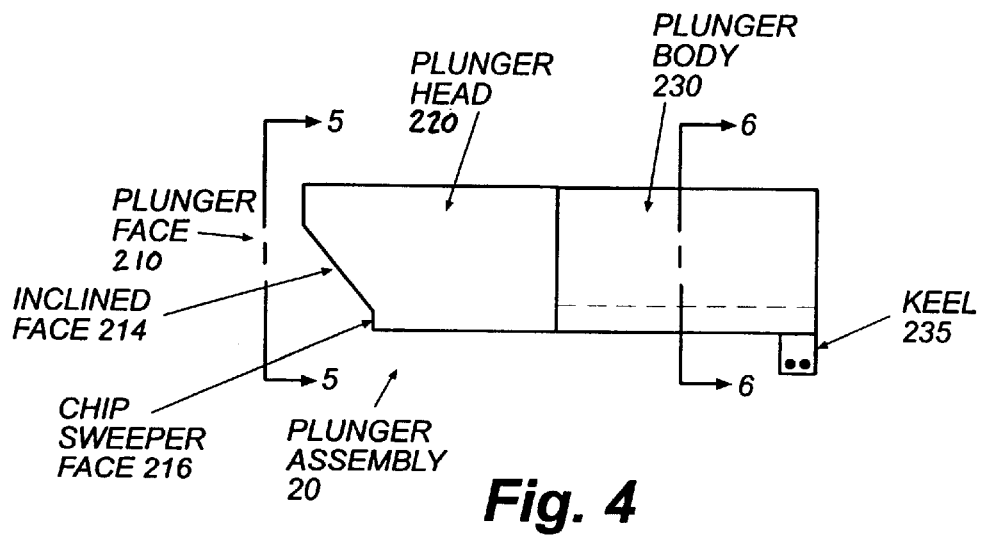
FIG. 4 is a diagrammatic illustration of the connection between the plunger head 220 and the plunger body 230, both of which comprise the reciprocating plunger assembly 20.

The plunger head 220, as shown in FIG. 4, can be made of high-density plastic such as Nylatron®, a moly-filled nylon containing precise amounts of moybdenum disulfide, a solid lubricant. Other materials may be used which provide the equivalent operability, including but not limited to wood. In one preferred embodiment, the plunger face 210 includes an inclined face 210 and a chip sweeper face 216. In one preferred emodiment, the angle between a horizontal plane and the inclined face 210 may be between 30 degrees and 45 degrees, and the chip sweeper face 216 may have a height of between one inch and one-and-a-half inches. It should be understood that these angles and dimensions are provided as an example only, none of which should be construed as limiting the shape or contour of the plunger face 210 or in any other respect limiting the present invention.

Figure 5:
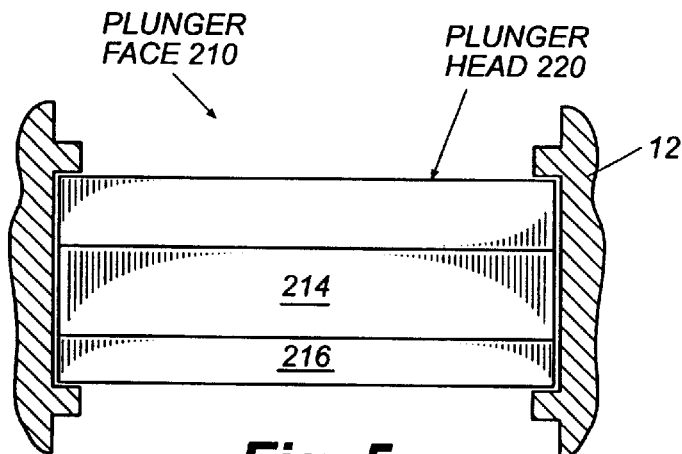
FIG. 5 is a cross section of frame 12, taken along line 5—5 of FIG. 4, ahead of the plunger head 220, to illustrate the features of the plunger face 210 as it slides toward the viewer.
Figure 6:
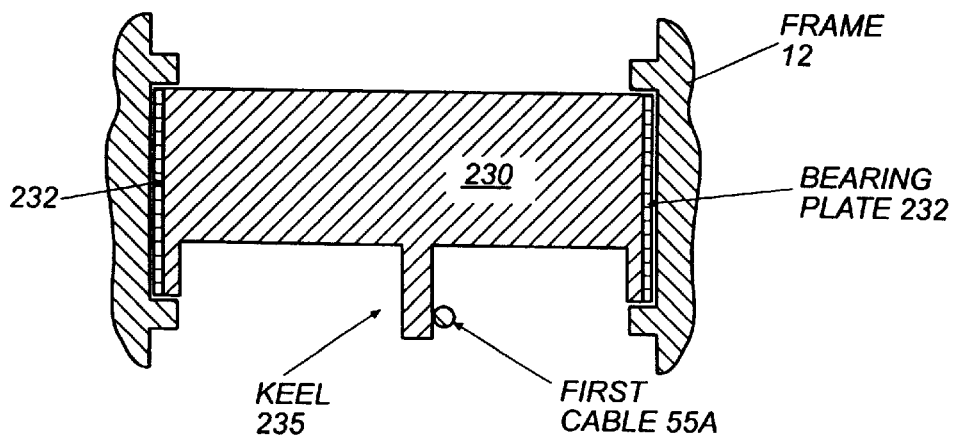
FIG. 6 is a cross-sectional view of the plunger body 230 and the first cable 55A attached to its keel 235, taken along line 66 of FIG. 4.

FIG. 5 illustrates the features of the plunger face 210 as it slides toward the saw blades 40. FIG. 6 shows the plunger body 230 and the first cable 55A attached to its keel 235. The plunger body 230 may be fabricated of any suitable material such as metal. The plunger body 230 may include a pair of sliding bearing plates 232 that fit within the plunger channel 250 in the overall frame 12. The bearing plates 232 may be made of high-density plastic such as Nylatron® or any other suitable material.

More Detailed Construction

Figure 7:
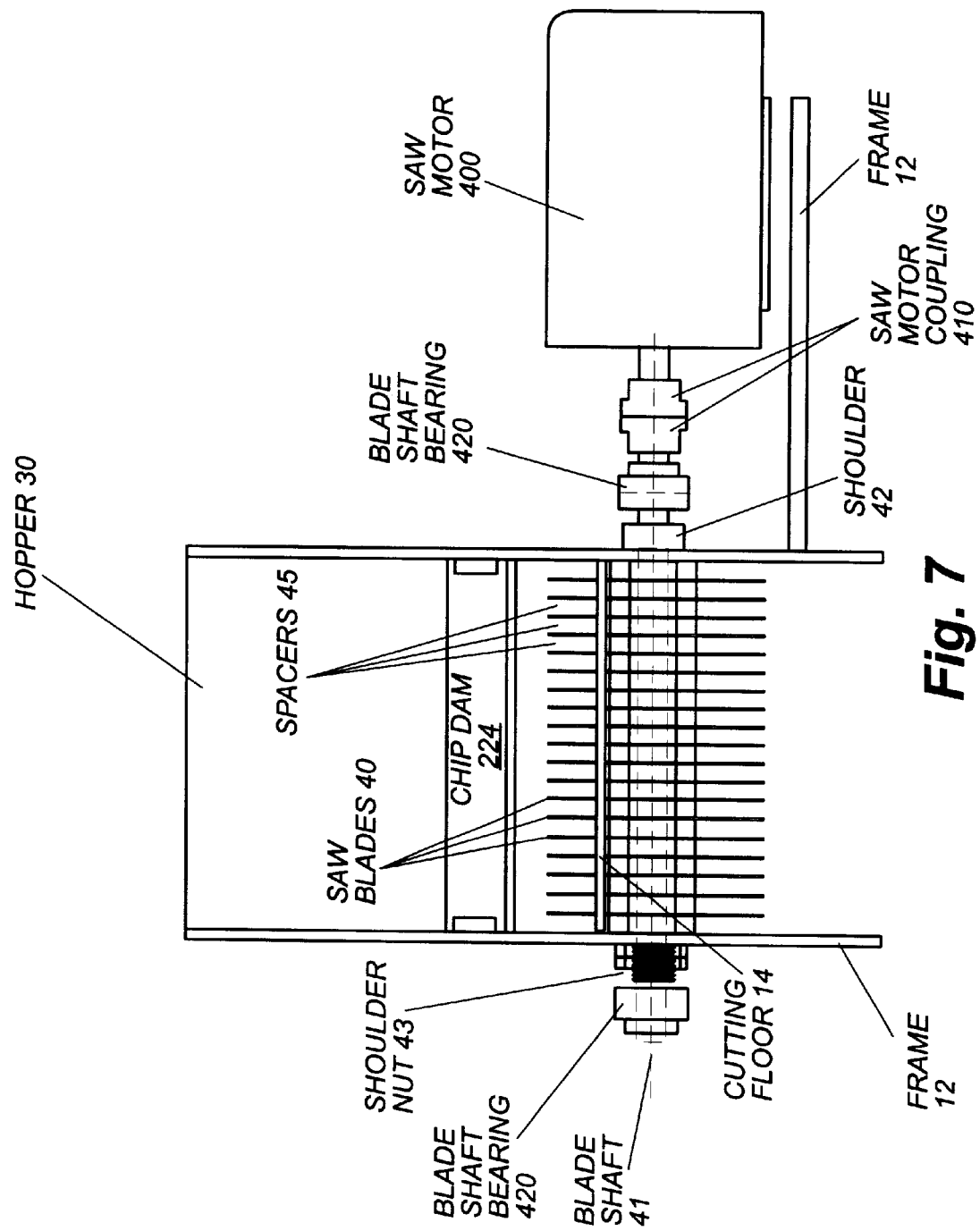
FIG. 7 is an end view illustrating the apparatus 10 according to the present invention, showing the saw blades 40 and various power components including the saw motor 400 and the common blade shaft 420.

FIG. 7 shows the apparatus 10 according to the present invention, including the orientation of the saw blades 40 and its associated power components. The circular saw blades 40 can be horizontally stacked on a horizontal shaft 41 along with spacers 45 of appropriate thickness to produce an acceptable wood chip size. The blade shaft 41 includes a solid shoulder 42 proximate one end and threads on the opposite end. The threaded end of the shaft allows a large shoulder nut 43 to be tightened against an adjacent spacer 45, causing the stacked spacers 45 and the saw blades 40 to be sandwiched together between the shoulder nut 43 and the shoulder 42, and holding the saw blades 40 in place on the blade shaft 41 to be rotated therewith.

Journals near the ends of the blade shaft 41 for blade shaft bearings 420 with tapered bushings allow for easy removal of the bearings 420 (shown without frame supports for purposes of simplicity). A saw motor coupling 410 with a quick disconnect sleeve such as known in the art can be used. By removing the blade shaft plates 47 (shown in FIG. 2), the blade shaft 41 can be removed and transported to a repair shop and/or an alternate shaft can be installed.

The shoulder nut 43 not only provides a stop for the endmost spacer 45, but also includes a pair of opposing flats which allow a wrench to grip the shaft 41 to control rotation thereof during assembly or disassembly.

In one preferred embodiment, the saw blades 40 may be nineteen inches in diameter, evenly spaced apart at one-and-one-eighth inches on center, horizontally stacked on a sixty-inch-long blade shaft 41 having a two-inch outside diameter. In another embodiment, the saw blades 40 may be fourteen inches in diameter. It should be understood that these dimensions are provided as an example only. Indeed, blades 40 and spacers 45 of different shapes and dimensions may be used, separately or in various combinations, to provide any desired spacing between and among the saw blades 40 and, thus, any desired resulting wood chip size.

It should also be understood that the apparatus 10 may be configured with saws other than circular saws, including but not limited to band saws, jigsaws, chain saws, or other power saws. Saw blades 40 of any type may be used, without departing from the scope of the invention, to provide the desired chip size. Moreove, it should be understood that the saw blades 40 may be powered by devices other than the saw motor 400, depending upon the particular saw type selected for the application.

Figure 8:
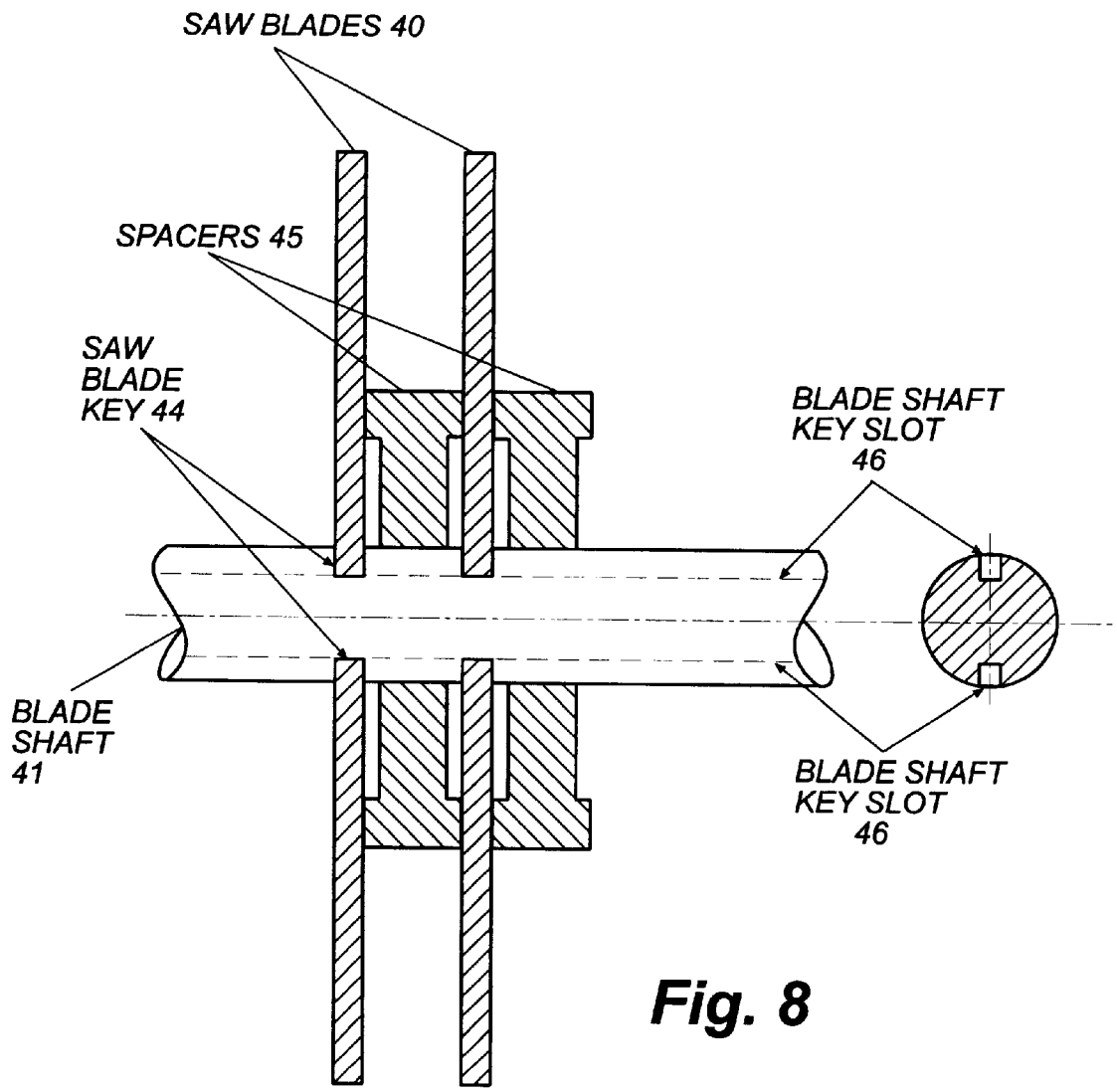
FIG. 8 is a cross-sectional view illustrating a plurality of saw blades 40 mounted on the blade shaft 41 and spaced apart by a plurality of spacers 45.

FIG. 8 shows the saw blades 40 mounted on the blade shaft 41 and spaced apart by a plurality of spacers 45. The saw blades 40 are substantially planar and circular, with opposing saw blade keys 44 cut in their center holes to provide an interlocking relationship with a pair of opposed blade shaft key slots 46 on the blade shaft 41. The interlocking keys 44 and key slots 46 prevent the saw blades 40 from rotating relative to the blade shaft 41. The spacers 45 need not be keyed.

Figure 9:
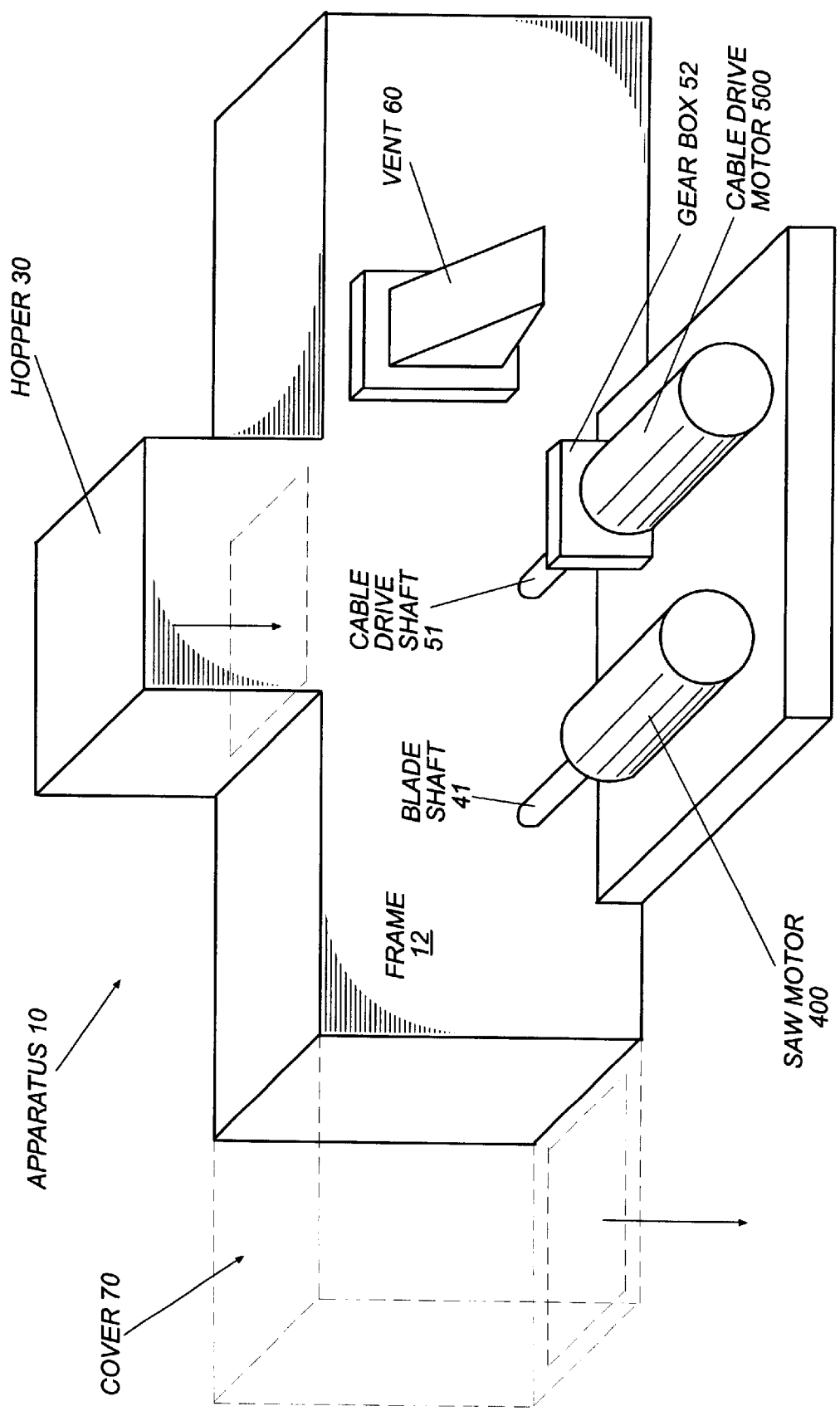
FIG. 9 is a pictorial view of the overall apparatus 10 which may include one or more vents 60 and a cover 70. Power components are also shown, including saw motor 400 connected to blade shaft 41, and cable drive motor 500 connected to cable drive shaft 51.

FIG. 9 is an exterior illustrative view of the apparatus 10 which has a frame 12. The apparatus may include one or more vents 60 and a cover 70. The vents 60 may be positioned to allow sawdust to exit the apparatus 10 and prevent jamming. A hopper 30 may be positioned to deposit overs 11 into the apparatus 10. Mounted to the frame 12 are the power components including saw motor 400 and cable drive motor 500. In one preferred embodiment, the cable drive motor 500 is a variable-speed, reversing, electric motor connected to a cable drive assembly 50 which moves the reciprocating plunger assembly 20 through its stroke 240, as shown in FIG. 9.

Figure 10:
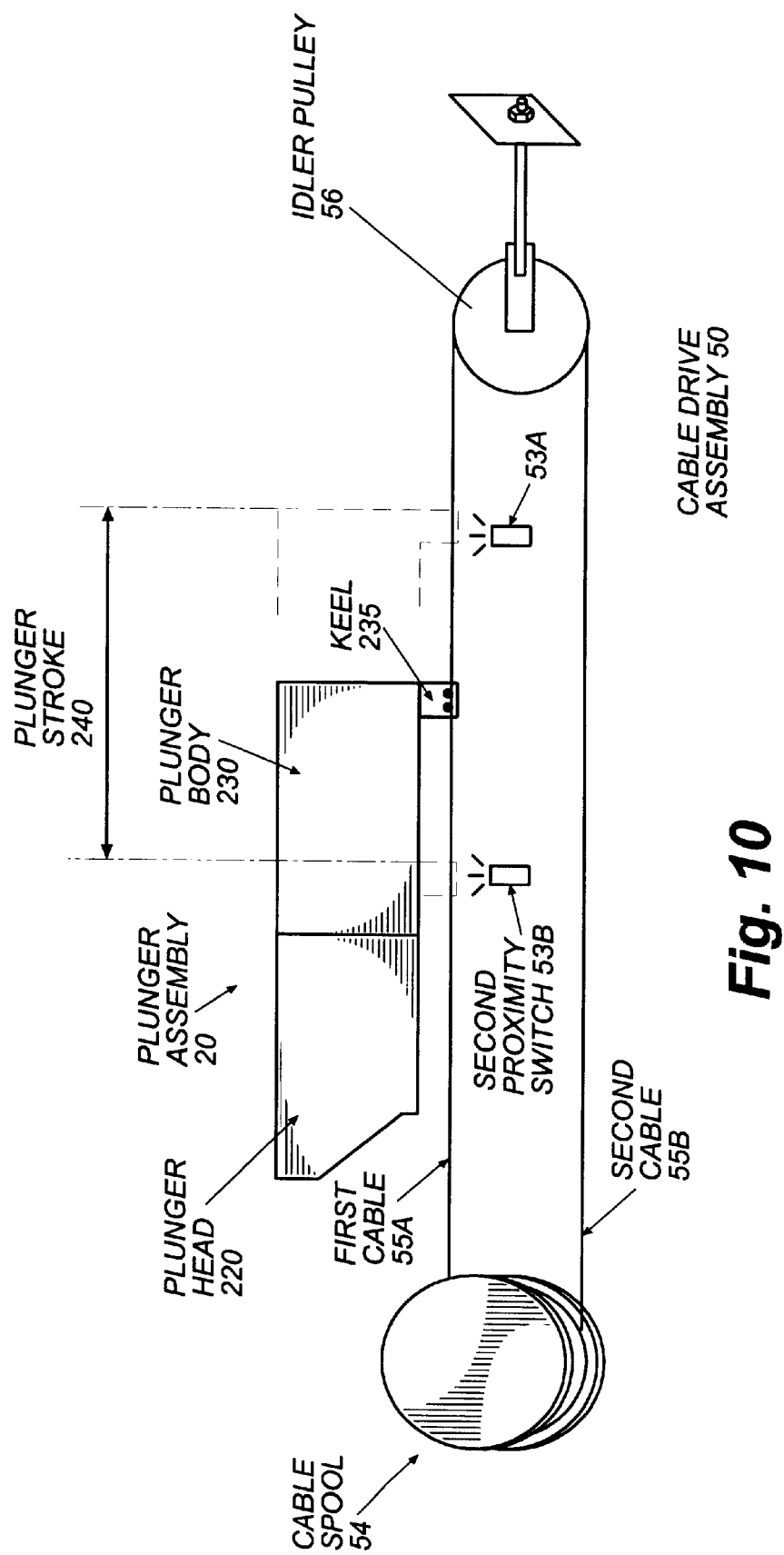
FIG. 10 is a general illustration of the cable drive assembly 50, including the cable spool 54, a first cable 55A, a second cable 55B, and an idler pulley 56. One end of each cable 55A, 55B is attached to a keel 235 extending from beneath plunger body 230 and the other end is attached to the cable spool 54, such that rotation of the cable spool 54 causes linear movement of the plunger assembly 20 through its plunger stroke 240.

In one preferred embodiment, the cable drive assembly 50 includes electronic controls and limit switches to program and control the motion of the reciprocating plunger assembly 20. FIG. 10 is an illustration of the various components of the cable drive assembly 50, including a cable spool 54, a first cable 55A, a second cable 55B, and an idler pulley 56. In one preferred embodiment, the plunger body 230 includes a keel 235 extending downwardly from the base of the plunger body 230. One end of each cable 55A, 55B is attached to the keel 235 and the other end is attached to the cable spool 54, such that rotation of the cable spool 54 causes linear movement of the plunger assembly 20.

In another aspect of one preferred embodiment, a first proximity switch 53A is positioned to sense the presence of the keel 235 when the plunger assembly 20 has completed its plunger stroke 240 toward the saw blades 40. A second proximity switch 53B is positioned to sense the presence of the keel 235 when the plunger assembly 20 has completed its plunger stroke 240 away from the saw blades 40. Controls may be programmed to automatically control the acceleration and speed of the plunger assembly 20 at particular points along its path. Other electronic functions are possible, such as stopping the plunger assembly 20 momentarily with a drive motor overload switch, making it possible to use a smaller drive motor and less power. Manual override buttons and safety switches may be placed conveniently on or near the apparatus 10.

It should also be understood that the plunger assembly 20 may be driven by devices other than the cable drive assembly 50 and its components. Any device capable of producing a linear, reciprocating movement of the plunger assembly 20 could be used, including but not limited to hydraulic cylinders or linear actuators, pneumatic devices, magnetic drives, or other types of motors fitted to the particular use.

Figure 11:
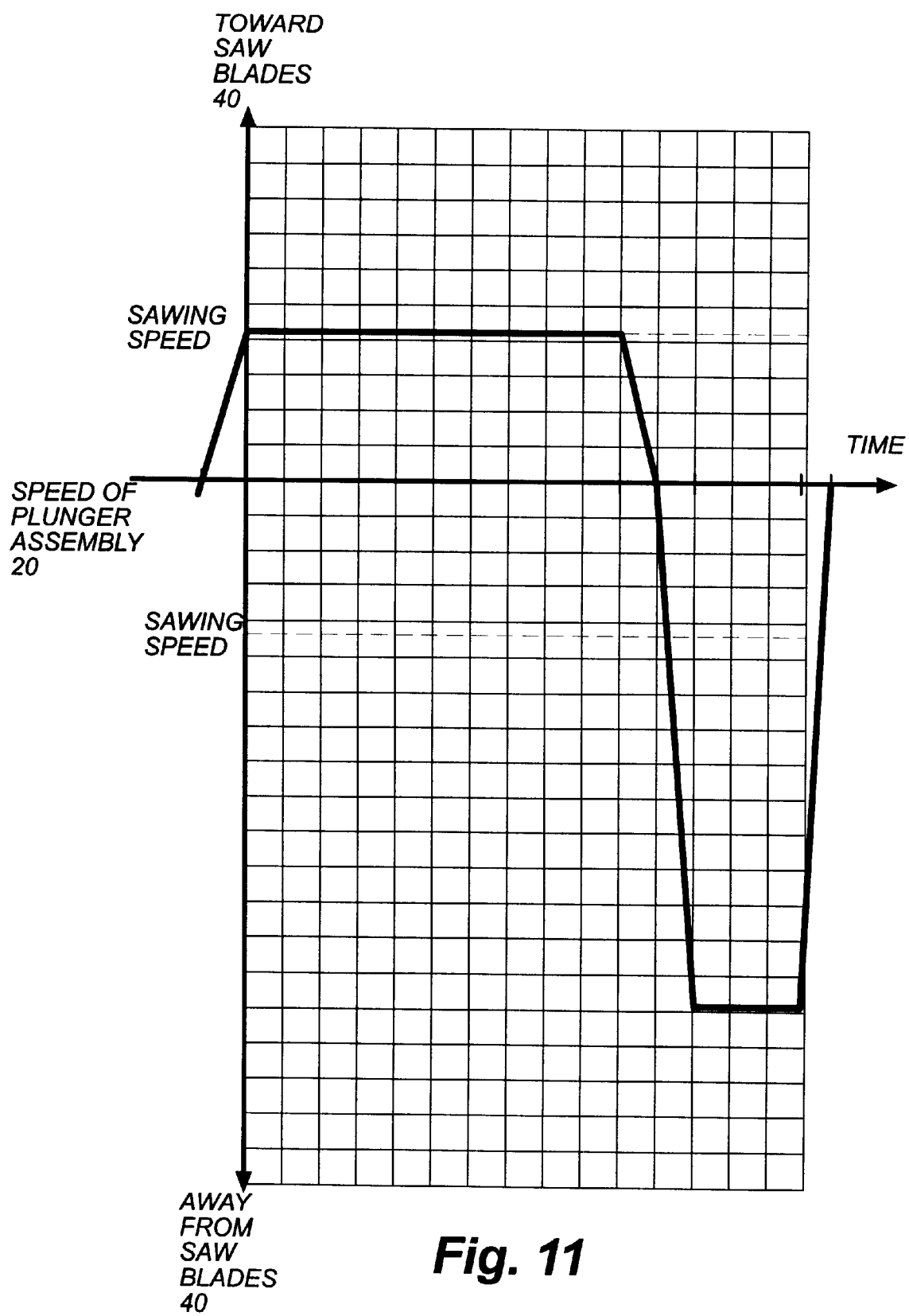
FIG. 11 is a graphical illustration of the speed of the plunger assembly 20 during its reciprocating cycle toward and away from the saw blades 40.

FIG. 11 illustrates the speed of the plunger assembly 20 during its outstroke toward the saw blades 40 and its backstroke away from saw blades 40. In one preferred embodiment, the motion of the plunger assembly 20 is programmed to fit the particular application. The programmed motion of one such embodiment is illustrated in FIG. 11. During the outstroke, the linear speed of the plunger assembly 20 remains at a relatively constant "sawing speed" which depends upon the particular application. At the end of the outstroke, where a first proximity switch 53A senses the arrival of the keel 235 (as shown in FIG. 10), the plunger assembly 20 decelerates to zero within approximately one second. At the beginning of the backstroke, the plunger assembly 20 accelerates within approximately one second from zero to a linear speed that may be significantly greater than its outstroke speed because the plunger assembly 20 is not performed any cutting work during the backstroke. At the end of the backstroke, where a second proximity switch 53B senses the arrival of the keel 235, the plunger assembly 20 decelerates to zero within approximately one second.

Alternative Configurations

Figure 12:
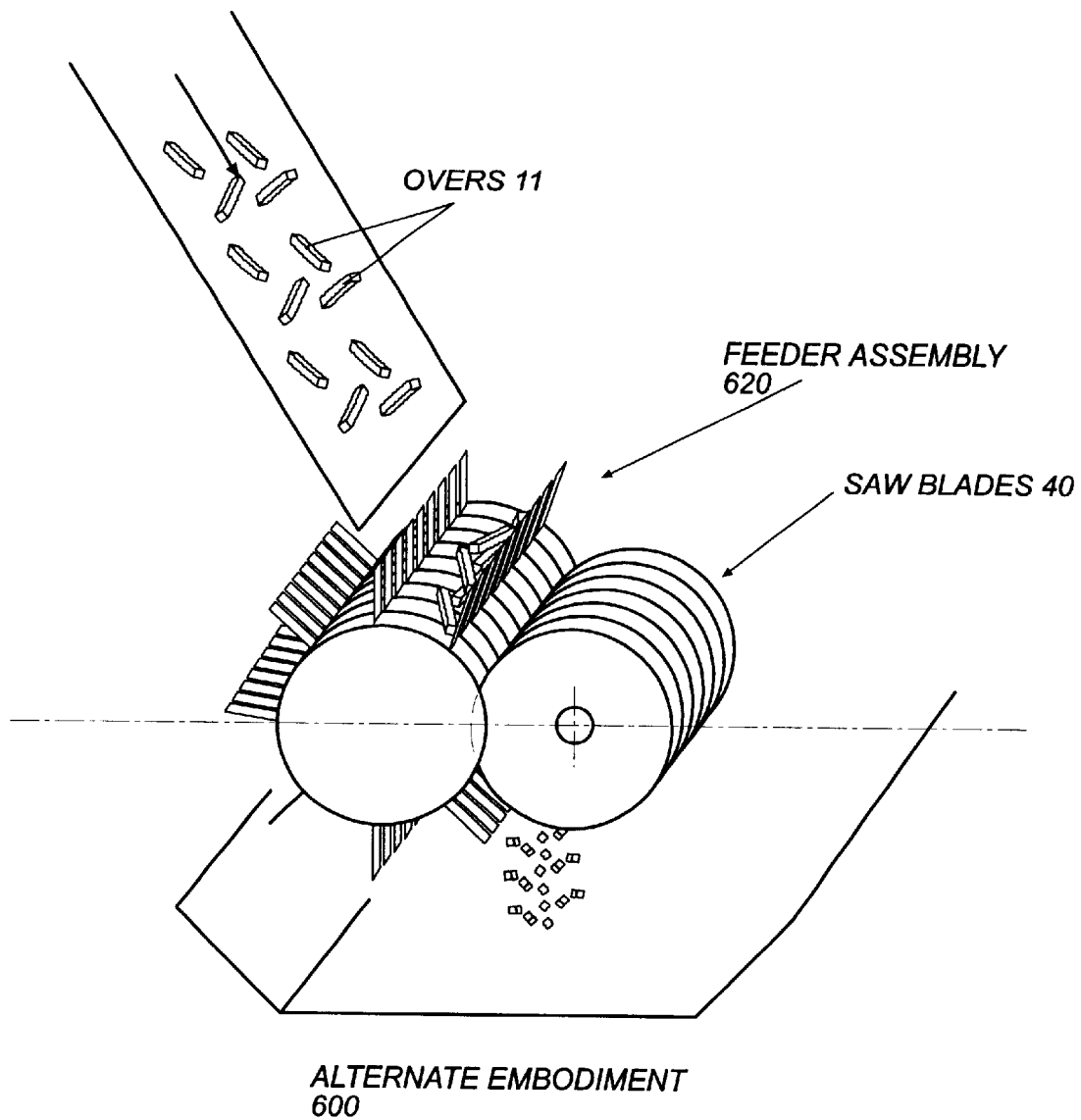
FIGS. 12, 13–14, and 15 illustrate alternative embodiments of the apparatus 10.

FIG. 12 illustrates an alternate embodiment 600, which is includes a plurality of saw blades 40 attached to a common shaft and a rotating paddlewheel-type feeder assembly 620. Feeder assembly 620 includes a slotted hub and a plurality of slotted chip sweepers 216 extending radially therefrom to force the overs 11 into the saw blades 40. The chip sweepers 216 may be constructed of high-density plastic 20 and may be slotted by the saws. The speed of the paddlewheel may be fixed or variable, and may be controlled to suit a particular application.

The paddlewheel may be controlled to reverse direction if a jam is detected.

Figure 13:
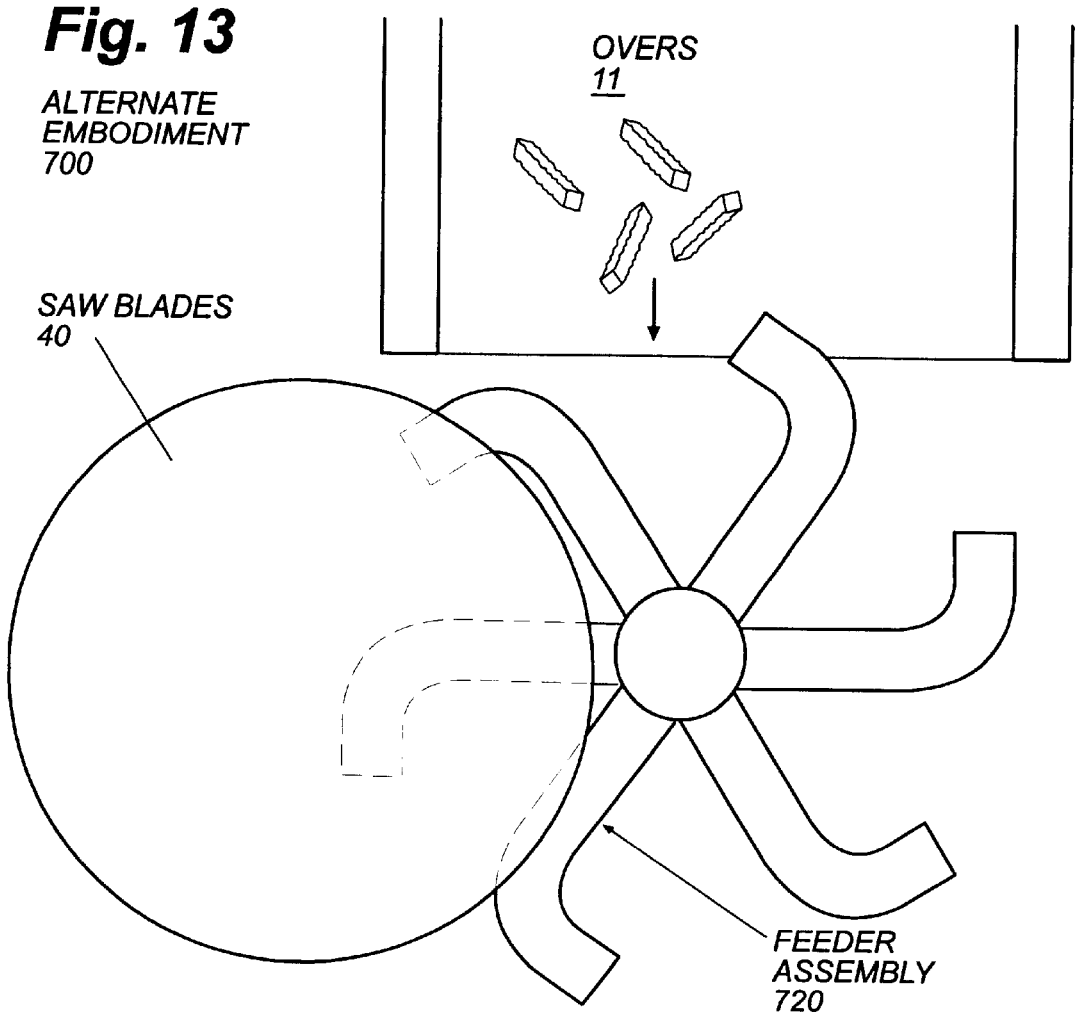
Figure 14:
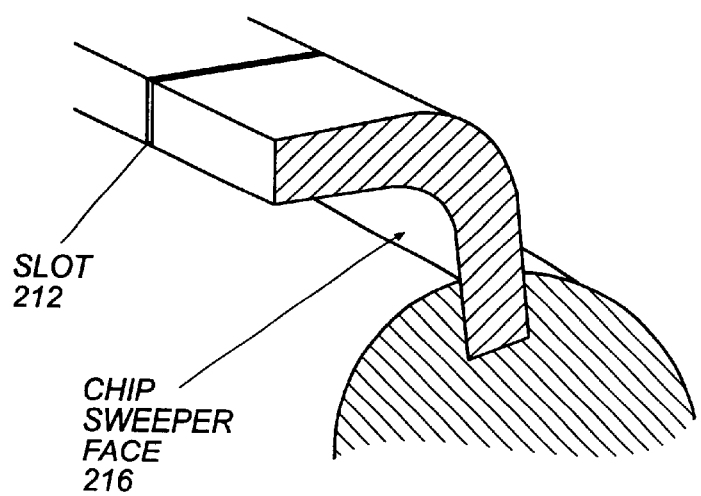

FIGS. 13 and 14 illustrate an alternate embodiment 700, which includes a plurality of saw blades 40 attached to a common shaft and a rotating paddlewheel-type feeder assembly 720. Feeder assembly 720 includes a central hub and a plurality of slotted chip sweepers 216 extending radially therefrom. Each chip sweeper 216 includes a slightly curved outermost end to better capture the overs 11 and guide them through the saw blades 40. FIG. 14 shows a mounting screw connecting a chip sweeper 216 to the central hub of the feeder assembly 720.

Figure 15:
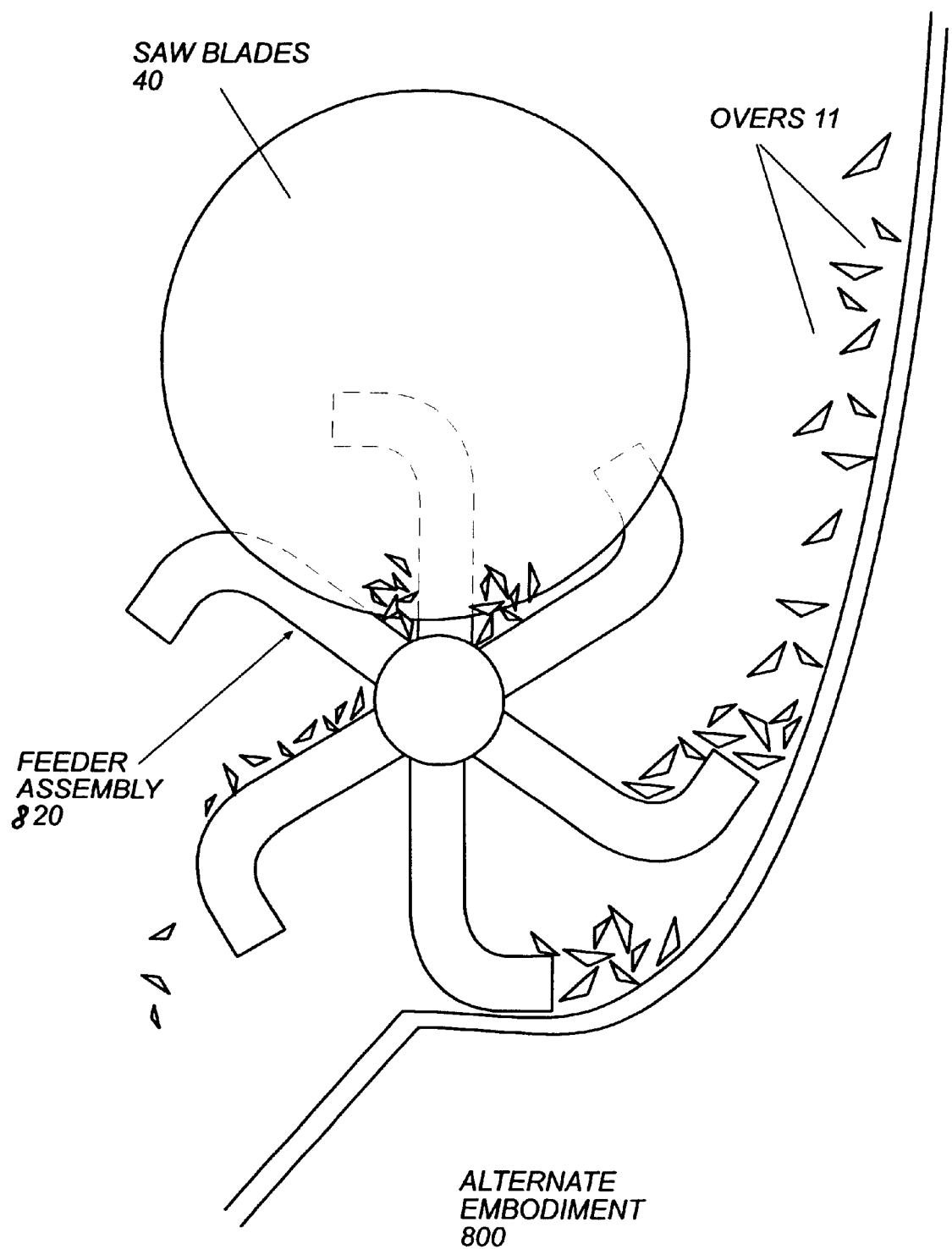

FIG. 15 illustrates an alternate embodiment 800, which includes a plurality of saw blades 40 attached to a common shaft and a rotating paddlewheel-type feeder assembly 820. Feeder assembly 820 includes a central hub and a plurality of slotted chip sweepers 216 extending radially therefrom. Each chip sweeper 216 includes a curved outermost end that is scoop-shaped to better capture the overs 11 and guide them through the saw blades 40.

Method

The method of the present invention accomplishes the reduction of oversized wood chips known as "overs" by using a reciprocating plunger assembly 20 to properly align the overs 11 and push them through a plurality of spaced-apart saw blades 40 to result in a wood chip of a desired size.

The method of using the apparatus 10 disclosed includes the general steps of introducing overs 11 into a hopper 30. Overs 11 fall from the hopper 30 under the force of gravity onto a cutting floor 14 where the overs 11 are aligned and pushed by the moving chip sweeper face 216 of the plunger assembly 20 toward a plurality of saw blades 40 for cutting. While the plunger assembly 20 is pushing the overs 11 through the saw blades 40, additional overs 11 continue to fall from the hopper 30 onto the top 222 of the plunger head 220.

It should be understood that the overs 11 may flow into the apparatus 10 continuously, one batch at a time, or in some other manner suitable to the particular application.

In an important aspect of the method of the present invention, the overs 11 resting on the plunger top 222 are aligned by a chip dam 224 positioned across the top of the plunger assembly 20 to stop and align the overs 11 while the plunger assembly 20 is retracting away from the saw blades 40. When retracted, the plunger assembly 20 withdraws beyond the plane of the chip dam 224 and the overs 11 fall to the cutting floor 14 where the process of further aligning and pushing the overs 11 into the saw blades 40 is repeated.

In another aspect of the method, the reciprocation of the plunger assembly 20 is controlled by a cable drive assembly 50. The method includes electronic controls and limit switches to govern the linear motion of the plunger assembly 20. In one preferred method, a keel 235 is attached to the plunger body 230 (as shown in FIG. 10) to accommodate the attachment of a first and second cable 55A, 55B. One end of each cable 55A, 55B is attached to the keel 235 and the other end is attached to the cable spool 54, such that rotation of the cable spool 54 by a cable drive motor 500 causes linear movement of the plunger assembly 20.

In another aspect of one preferred method, one or more proximity switches are positioned to sense the presence of the keel 235 as the plunger assembly 20 reaches a certain location within its stroke 240 toward and away from the saw blades 40.

In another aspect of the method, the saw blade shaft 41 can be easily removed from the frame 12 of the apparatus 10 by disconnecting a saw motor coupling 410, removing a pair of blade shaft plates 47, and lifting out the entire blade shaft 41.

In one preferred embodiment, the method of the present invention includes the preliminary steps of attaching a blank plunger head 220, not yet having any recesses 212, to the plunger body 230 while the plunger assembly 20 is disengaged from the saw blades 40. By moving the blank plunger head 220 slowly into the saw blades 30, the array of saw blades 40 cut a matching array of recesses 212 into the plunger head 220. This preliminary method step assures a matching fit between the saw blades 40 and the recesses 212.

It should be understood that the apparatus 10 may be used with a variety of chip feeder assemblies and/or methods for collecting and moving overs 11 into the hopper 30, including but not limited to belt or chain conveyors, either static or vibrating, or other feeder methods that will tend to align the overs 11 in the orientation desired for cutting. In one such configuration, one or more conveyors will feed the hopper 30 from an angle perpendicular to the direction of the motion of the plunger assembly 20, such that elongate overs 11 will tend to be introduced into the hopper 30 of the apparatus 10 with a tendency to be perpendicular to the saw blades 40. A tapering or narrowing conveyor may also be used to align the overs 11 before they are introduced into the hopper 30.

It should also be understood that the apparatus 10 may be used with a variety of chip screens and chip conveyors to select overs 11 that remain too large after being subject to cutting by the apparatus 10, and to return the overs 11 to the hopper 30 so that they may be passed again through the apparatus 10 to be further reduced. Thus the apparatus may cut a particular over in one direction and then later in a second direction.

Conclusion

Therefore, it may be understood that the present invention provides an apparatus and a method for reducing certain oversized wood chips known as "overs" by cutting them smoothly, with relatively no impact, such that the resulting chips can be used to make paper, cardboard, and other recyclable materials.

While this invention has been described in specific detail with reference to the disclosed embodiments, it will be understood that many variations and modifications may be effected without departing from the spirit and scope of the invention as described in the appended claims.

What is claimed is:

1. An apparatus for processing a plurality of wood chips, comprising:
   a frame;
   a saw assembly comprising an array of circular blades each including a cutting edge, said array of circular blades defining gaps therebetween, and said array of circular blades also defining a cylindrical cutting zone;
   a plunger on said frame, said plunger defining a plunger face and also defining an array of recesses therein positioned to accept insertion of said array of circular blades, said plunger comprising a planar portion and an overhanging portion, said plunger moveable relative to said saw assembly from first position to a second position, said first position being characterized by said plunger being disengaged from said array of circular blades wherein said plunge face is spaced apart from said cutting edges, said second position being characterized by said plunger being engaged with said array of circular blades wherein said array of circular blades is at least partially inserted within said array of recesses; and
   a plunger actuator for moving said plunger from said first position to said second position, such that said wood chips placed intermediate said plunger and said saw assembly may be pushed by said plunger into said cutting edges to create a plurality of cut wood chips within said gaps, and wherein said cut wood chips are pushed into and then completely through at least a portion of said cutting zone while being at least partially contained by said overhanging portion as said plunger reaches said second position, said plunger actuator further capable of returning said plunger from said second position to said first position.

2. The apparatus of claim 1, wherein said frame further defines a channel, said channel comprising a floor, a plurality of side walls, and a plurality of slots in said floor, said slots being located and sized such that said array of circular blades protrudes therethrough, and said plunger being configured to move within said channel toward said array of circular blades while pushing said wood chips within said channel.

3. The apparatus of claim 1, wherein said planar portion is shaped to align said wood chips substantially parallel to said planar portion as said plunger moves from said first position to said second position.

4. The apparatus of claim 1, further comprising a dam positioned above and adjacent said plunger, said dam being shaped to align said wood chips substantially parallel to said plunger face as said plunger returns from said second position to said first position.

5. The apparatus of claim 1, wherein said plunger actuator further comprises a motor, a drive shaft connected to said motor, a drive assembly disposed between said drive shaft and said plunger, said drive assembly configured to move said plunger back and forth between said first position and said second position, a plurality of sensors responsive to the position of said plunger, and a controller in communication with said plurality of sensors for activating said plunger actuator in response to a specified position of said plunger.

6. An apparatus for processing a plurality of wood chips, comprising:
   a frame;
   a saw assembly comprising an array of circular blades each including a cutting edge, said array of circular blades defining gaps therebetween, and said array of circular blades also defining a cylindrical cutting zone;
   a plunger on said frame, said plunger defining a plunger face and also defining an array of recesses therein positioned to accept insertion of said array of circular blades, said plunger moveable relative to said saw assembly from a first position to a second position, said first position being characterized by said plunger being disengaged from said array of circular blades wherein said plunger face is spaced apart from said cutting edges, said second position being characterized by said plunger being engaged with said array of circular blades wherein said array of circular blades is at least partially inserted within said array of recesses;
   a dam positioned above and adjacent said plunger, said dam being shaped to align said wood chips substantially parallel to said planar portion of said plunger face as said plunger returns from said second position to said first position; and
   a plunger actuator for moving said plunger from said first position to said second position, such that said wood chips placed intermediate said plunger and said saw assembly may be pushed by said plunger into said cutting edges to create a plurality of cut wood chips within said gaps, and wherein said cut wood chips are pushed into and then completely through at least a portion of said cutting zone as said plunger reaches said second position, said plunger actuator further capable of returning said plunger from said second position to said first position.

7. The apparatus of claim 6, wherein said plunger face further comprises a planar portion in addition to said overhanging portion, said planar portion being shaped to align said wood chips substantially parallel to said planar portion as said plunger moves from said first position to said second position.

8. The apparatus of claim 6, wherein said frame further defines a channel, said channel comprising a floor, a plurality of side walls, and a plurality of slots in said floor, said slots being located and sized such that said array of circular blades protrudes therethrough, and said plunger being configured to move within said channel toward said array of circular blades while pushing said wood chips within said channel.

9. The apparatus of claim 8, wherein said frame further comprises a plurality of guide rails positioned to guide said plunger along said floor of said channel.

10. The apparatus of claim 6, wherein said saw assembly further comprises a saw motor, a shaft connected to said motor, a coupling disposed between said saw motor and said shaft, a plurality of bearings positioned to support said shaft, an array of circular blades disposed upon said shaft, and an array of spacers disposed upon said shaft between each of said circular blades.

11. The apparatus of claim 6, wherein said plunger actuator further comprises a motor, a drive shaft connected to said motor, a drive assembly disposed between said drive shaft and said plunger, said drive assembly configured to move said plunger back and forth between said first position and said second position, a plurality of sensors responsive to the position of said plunger, and a controller in communication with said plurality of sensors for activating said plunger actuator in response to a specified position of said plunger.

12. The apparatus of claim 11, wherein said drive assembly comprises a cable spool disposed upon said drive shaft, a keel descending from said plunger, a first cable coupled to said keel and said cable spool, a second cable coupled to said keel and said cable spool, and an idler pulley supporting said second cable and mounted to said frame.

13. The apparatus of claim 11, wherein said plurality of sensors comprises a first proximity switch positioned to sense the presence of said plunger at said first position and a second proximity switch positioned to sense the presence of said plunger at said second position.

14. An apparatus for processing a plurality of wood chips, comprising:
 a saw assembly comprising an array of circular blades disposed upon a common shaft, an array of spacers disposed upon said shaft, said spacers positioned alternately between said circular blades, and a saw motor for rotating said shaft;
 a feeder assembly positioned to accept an incoming flow of wood chips, said feeder assembly comprising a plurality of paddles fixedly connected to a central hub, said hub mounted in such a manner as to permit rotation of the entire feeder assembly about an axis, said axis being located adjacent said common shaft in such a location as to permit the intersection of said plurality of paddles and said array of circular blades, said paddles including an array of slots therethrough positioned to accept insertion of said array of circular blades; and
 an actuator for rotating said feeder assembly about said axis at a specified rotational velocity,
 such that as said feeder assembly is rotated about said axis, said paddles urge said incoming wood flow of chips towards said array of circular blades, such that said feeder assembly feeds said wood chips into said array of circular blades and said wood chips are cut by said blades.

15. The apparatus of claim 14, wherein said plurality of paddles comprise a flat inner portion and a contoured outer portion, said contoured outer portion being sized to capture said wood chips, shaped to orient said wood chips substantially parallel to said axis, and positioned to guide said wood chips into and completely through said array of circular blades.

16. A method for processing wood chips, comprising the steps of:
 providing a moveable plunger and a saw assembly, said saw comprising an array of blades, said array of blades defining gaps therebetween, said array of blades defining a cutting zone, said plunger comprising a plunger face and an array of recesses therein, said recesses positioned to accept insertion of said array of blades, said plunger face comprising a planar portion and an overhanging portion, said plunger moveable relative to said saw assembly from a first position to a second position, said first position being characterized by said plunger being disengaged from said array of blades wherein said plunger face is spaced apart from said cutting edges, said second position being characterized by said plunger being engaged with said array of blades wherein said array of blades is at least partially inserted within said array of recesses;
 moving said plunger from a first position to a second position relative to said saw assembly, such that said wood chips placed intermediate said plunger and said saw assembly may be pushed by said plunger into said cutting edges to create a plurality of cut wood chips within said gaps, and wherein said cut wood chips are pushed into and then completely through at least a portion of said cutting zone as said plunger reaches said second position.

17. The method of claim 16, the method further comprising the step of:
 containing said wood chips within said cutting zone during cutting by holding said wood chips in place relative to said array of blades with said overhanging portion of said plunger face.

18. The method of claim 16, wherein a portion of said wood chips are characterized by their elongate shape, the method further comprising the step of:
 orienting said elongate wood chips to be substantially parallel to said plunger face as said plunger moves from said first position to said second position by pushing said elongate wood chips with said planar portion of said plunger face.

19. The method of claim 16, wherein a portion of said wood chips are characterized by their elongate shape, the method further comprising the step of:
 orienting said elongate wood chips to be substantially parallel to said plunger face as said plunger moves from said second position to said first position by pushing said elongate wood chips with a dam, said dam positioned above and adjacent said plunger.

20. The method of claim 16, further comprising the step of returning said plunger from said second position to said first position.

21. The method of claim 20, wherein a portion of said wood chips are characterized by their elongate shape, the method further comprising the step of:

orienting said elongate wood chips to be substantially parallel to said plunger face as said plunger returns from said second position to said first position by pushing said elongate wood chips with a dam, said dam positioned above and adjacent said plunger.

22. The method of claim 16, wherein said step of moving said plunger from a first position to a second position relative to said saw assembly is performed by a plunger actuator, said plunger actuator comprising a motor, a drive shaft connected to said motor, a drive assembly disposed between said drive shaft and said plunger, said drive assembly configured to move said plunger back and forth between said first position and said second position, a plurality of sensors responsive to the position of said plunger, and a controller in communication with said plurality of sensors for activating said plunger actuator in response to a specified position of said plunger.

23. The method of claim 22, wherein said drive assembly comprises a cable spool disposed upon said drive shaft, a keel descending from said plunger, a first cable coupled to said keel and said cable spool, a second cable coupled to said keel and said cable spool, and an idler pulley supporting said second cable and mounted to said frame.

24. The method of claim 22, wherein said plurality of sensors comprises a first proximity switch and a second proximity switch.

25. The method of claim 22, further comprising the steps of:
   a. accelerating said plunger from said first position toward said cutting zone from zero to a specified sawing velocity using said drive assembly;
   b. moving said plunger at said specified sawing velocity using said drive assembly toward, into, and then completely through said cutting zone;
   c. sensing the presence of said plunger at said second position using said plurality of sensors;
   d. decelerating said plunger from said specified sawing velocity to zero using said drive assembly;
   e. accelerating said plunger away from said cutting zone from zero to a specified returning velocity using said drive assembly;
   f. moving said plunger at said specified returning velocity using said drive assembly toward said first position;
   g. sensing the presence of said plunger at said first position using said plurality of sensors;
   h. decelerating said plunger from said specified returning velocity to zero using said drive assembly; and
   i. controlling said drive assembly to repeat said steps (a) through (h).

26. The method of claim 16, wherein said plunger face before its first use is characterized by its lack of recesses, the method further comprising the preliminary steps of:
   attaching said plunger face to said plunger in said first position;
   moving said plunger from said first position to said second position such that said array of blades cut into said plunger face and create a plurality of matching recesses therein;
   returning said plunger from said second position to said first position.

27. An apparatus for processing a plurality of generally elongate wood chips, comprising:
   a saw assembly comprising an array of blades; and
   a plunger configured to collect, align, and move said wood chips into said array of blades to create a plurality of cut wood chips,
   said plunger comprising a planar portion shaped to align said wood chips in preparation for a transverse cutting and an overhanging portion shaped to contain said wood chips during said transverse cutting.

28. The apparatus of claim 27, further comprising a plunger actuator to control the movement of said plunger such that said plunger is sequentially engaged and disengaged with said array of blades.

29. An apparatus for processing a plurality of wood chips, comprising:
   a frame;
   a saw assembly comprising an array of blades driven at a cutting speed, each of said blades including a cutting edge;
   a plunger mounted on said frame, said plunger defining a plunger face and also defining an array of recesses therein positioned to accept insertion of said array of blades, said a plunger moveable relative to said saw assembly from a first position to a second position, said first position being characterized by said plunger being disengaged from said array of blades wherein said plunger face is spaced apart from said cutting edges, said second position being characterized by said plunger being engaged with said array of blades wherein said array of blades is at least partially inserted within said array of recesses; and
   a plunger actuator for moving said plunger from said first position to said second position, such that said wood chips placed intermediate said plunger and said saw assembly may be pushed by said plunger into said cutting edges to create a plurality of cut wood chips therefrom, and wherein said cut wood chips are pushed beyond said cutting edges as said plunger reaches said second position, said plunger actuator further capable of returning said plunger from said second position to said first position,
   wherein said frame further defines a channel, said channel comprising a floor, a plurality of side walls, and a plurality of slots in said floor, said slots being located and sized such that said array of blades protrudes therethrough, and said plunger being configured to move within said channel toward said array of blades while pushing said wood chips within said channel.

30. An apparatus for processing a plurality of wood chips, comprising:
   a frame;
   a saw assembly comprising an array of blades driven at a cutting speed, each of said blades including a cutting edge;
   a plunger mounted on said frame, said plunger defining a plunger face and also defining an array of recesses therein positioned to accept insertion of said array of blades, said plunger moveable relative to said saw assembly from a first position to a second position, said first position being characterized by said plunger being disengaged from said array of blades wherein said plunger face is spaced apart from said cutting edges, said second position being characterized by said plunger being engaged with said array of blades wherein said array of blades is at least partially inserted within said array of recesses; and
   a plunger actuator for moving said plunger from said first position to said second position, such that said wood chips placed intermediate said plunger and said saw assembly may be pushed by said plunger into said cutting edges to create a plurality of cut wood chips therefrom, and wherein said cut wood chips are pushed beyond said cutting edges as said plunger reaches said second position, said plunger actuator further capable of returning said plunger from said second position to said first position, and wherein said plunger actuator further comprises a motor, a drive shaft connected to said motor, a drive assembly disposed between said drive shaft and said plunger, said drive assembly configured to move said plunger between said first position and said second position, a plurality of sensors responsive to the position of said plunger, and a controller in communication with said plurality of sensors for activating said plunger actuator in response to a specified position of said plunger.

31. An apparatus for processing a plurality of wood chips, comprising:

a frame;

a saw assembly comprising an array of blades driven at a cutting speed, each of said blades including a cutting edge;

a plunger mounted on said frame, said plunger defining a plunger face and also defining an array of recesses therein positioned to accept insertion of said array of blades, said plunger moveable relative to said saw assembly from a first position to a second position, said first position being characterized by said plunger being disengaged from said array of blades wherein said plunger face is spaced apart from said cutting edges, said second position being characterized by said plunger being engaged with said array of blades wherein said array of blades is at least partially inserted within said array of recesses; and a plunger actuator for moving said plunger from said first position to said second position, such that said wood chips placed intermediate said plunger and said saw assembly may be pushed by said plunger into said cutting edges to create a plurality of cut wood chips therefrom, and wherein said cut wood chips are pushed beyond said cutting edges as said plunger reaches said second position, said plunger actuator further capable of returning said plunger from said second position to said first position, said plunger face further comprising a planar portion and an overhanging portion, said planar portion shaped to align said wood chips substantially parallel to said planar portion as said plunger moves from said first position to said second position, said overhanging portion shaped to contain said wood chips during cutting.

32. An apparatus for processing a plurality of wood chips, comprising:

a frame;

a saw assembly comprising an array of blades driven at a cutting speed, each of said blades including a cutting edge;

a plunger mounted on said frame, said plunger defining a plunger face and also defining an array of recesses therein positioned to accept insertion of said array of blades, said plunger moveable relative to said saw assembly from a first position to a second position, said first position being characterized by said plunger being disengaged from said array of blades wherein said plunger face is spaced apart from said cutting edges, said second position being characterized by said plunger being engaged with said array of blades wherein said array of blades is at least partially inserted within said array of recesses;

a plunger actuator for moving said plunger from said first position to said second position, such that said wood chips placed intermediate said plunger and said saw assembly may be pushed by said plunger into said cutting edges to create a plurality of cut wood chips therefrom, and wherein said cut wood chips are pushed beyond said cutting edges as said plunger reaches said second position, said plunger actuator further capable of returning said plunger from said second position to said first position; and a dam positioned above and adjacent said plunger, said dam being shaped to align said wood chips substantially parallel to said plunger face.

33. An apparatus for processing a plurality of wood chips, comprising:

a frame;

a saw assembly comprising an array of circular blades driven at a cutting speed, each of said circular blades including a cutting edge, said array of circular blades defining gaps therebetween;

a plunger mounted on said frame, said plunger defining a plunger face and also defining an array of recesses therein positioned to accept insertion of said array of circular blades, said plunger moveable relative to said saw assembly from a first position to a second position, said first position being characterized by said plunger being disengaged from said array of circular blades wherein said plunger face is spaced apart from said cutting edges, said second position being characterized by said plunger being engaged with said array of circular blades wherein said array of circular blades is at least partially inserted within said array of recesses; and a plunger actuator for moving said plunger from said first position to said second position, such that said wood chips placed intermediate said plunger and said saw assembly may be pushed by said plunger into said cutting edges to create a plurality of cut wood chips within said gaps, and wherein said cut wood chips are pushed completely through said gaps and beyond said cutting edges as said plunger reaches said second position, said plunger actuator further capable of returning said plunger from said second position to said first position, wherein said frame further defines a channel, said channel comprising a floor, a plurality of side walls, and a plurality of slots in said floor, said slots being located and sized such that said array of circular blades protrudes therethrough, and said plunger being configured to move within said channel toward said array of circular blades while pushing said wood chips within said channel.

34. An apparatus for processing a plurality of wood chips, comprising:

a frame;

a saw assembly comprising an array of circular blades driven at a cutting speed, each of said circular blades including a cutting edge, said array of circular blades defining gaps therebetween;

a plunger mounted on said frame, said plunger defining a plunger face and also defining an array of recesses therein positioned to accept insertion of said array of circular blades, said plunger moveable relative to said saw assembly from a first position to a second position, said first position being characterized by said plunger being disengaged from said array of circular blades wherein said plunger face is spaced apart from said cutting edges, said second position being characterized by said plunger being engaged with said array of circular blades wherein said array of circular blades is at least partially inserted within said array of recesses; and a plunger actuator for moving said plunger from said first position to said second position, such that said wood chips placed intermediate said plunger and said saw assembly may be pushed by said plunger into said cutting edges to create a plurality of cut wood chips within said gaps, and wherein said cut wood chips are pushed completely through said gaps and beyond said cutting edges as said plunger reaches said second position, said plunger actuator further capable of returning said plunger from said second position to said first position, wherein said plunger actuator further comprises a motor, a drive shaft connected to said motor, a drive assembly disposed between said drive shaft and said plunger, said drive assembly configured to move said plunger between said first position and said second position, a plurality of sensors responsive to the position of said plunger, and a controller in communication with said plurality of sensors for activating said plunger actuator in response to a specified position of said plunger.

35. An apparatus for processing a plurality of wood chips, comprising:

a frame;

a saw assembly comprising an array of circular blades driven at a cutting speed, each of said circular blades including a cutting edge, said array of circular blades defining gaps therebetween;

a plunger mounted on said frame, said plunger defining a plunger face and also defining an array of recesses therein positioned to accept insertion of said array of circular blades, said plunger moveable relative to said saw assembly from a first position to a second position, said first position being characterized by said plunger being disengaged from said array of circular blades wherein said plunger face is spaced apart from said cutting edges, said second position being characterized by said plunger being engaged with said array of circular blades wherein said array of circular blades is at least partially inserted within said array of recesses; and a plunger actuator for moving said plunger from said first position to said second position, such that said wood chips placed intermediate said plunger and said saw assembly may be pushed by said plunger into said cutting edges to create a plurality of cut wood chips within said gaps, and wherein said cut wood chips are pushed completely through said gaps and beyond said cutting edges as said plunger reaches said second position, said plunger actuator further capable of returning said plunger from said second position to said first position, wherein said plunger face further comprises a planar portion and an overhanging portion, said planar portion shaped to align said wood chips substantially parallel to said planar portion as said plunger moves from said first position to said second position, said overhanging portion shaped to contain said wood chips during cutting.

36. An apparatus for processing a plurality of wood chips, comprising:

a frame;

a saw assembly comprising an array of circular blades driven at a cutting speed, each of said circular blades including a cutting edge, said array of circular blades defining gaps therebetween;

a plunger mourned on said frame, said plunger defining a plunger face and also defining an array of recesses therein positioned to accept insertion of said array of circular blades, said plunger moveable relative to said saw assembly from a first position to a second position, said first position being characterized by said plunger being disengaged from said array of circular blades wherein said plunger face is spaced apart from said cutting edges, said second position being characterized by said plunger being engaged with said array of circular blades wherein said array of circular blades is at least partially inserted within said array of recesses;

a plunger actuator for moving said plunger from said first position to said second position, such that said wood chips placed intermediate said plunger and said saw assembly may be pushed by said plunger into said cutting edges to create a plurality of cut wood chips within said gaps, and wherein said cut wood chips are pushed completely through said gaps and beyond said cutting edges as said plunger reaches said second position, said plunger actuator further capable of returning said plunger from said second position to said first position; and a dam positioned above and adjacent said plunger, said dam being shaped to align said wood chips substantially parallel to said plunger face.

37. An apparatus for processing a plurality of wood chips, comprising:

a frame;

a saw assembly comprising an array of circular blades driven at a cutting speed, each of said circular blades including a cutting edge, said array of circular blades defining gaps therebetween, and said array of circular blades also defining a cylindrical cutting zone;

a plunger mounted on said frame, said plunger defining a plunger face and also defining an array of recesses therein positioned to accept insertion of said array of circular blades, said plunger moveable relative to said saw assembly from a first position to a second position, said first position being characterized by said plunger being disengaged from said array of circular blades wherein said plunger face is spaced apart from said cutting edges, said second position being characterized by said plunger being engaged with said array of circular blades wherein said array of circular blades is at least partially inserted within said array of recesses; and a plunger actuator for moving said plunger from said first position to said second position, such that said wood chips placed intermediate said plunger and said saw assembly may be pushed by said plunger into said cutting edges to create a plurality of cut wood chips within said gaps, and wherein said cut wood chips are pushed into and then completely through at least a portion of said cutting zone as said plunger reaches said second position, said plunger actuator further capable of returning said plunger from said second position to said first position, wherein said frame further defines a channel, said channel comprising a floor, a plurality of side walls, and a plurality of slots in said floor, said slots being located and sized such that said array of circular blades protrudes therethrough, and said plunger being configured to move within said channel toward said array of circular blades while pushing said wood chips within said channel.

38. An apparatus for processing a plurality of wood chips, comprising:

a frame;

a saw assembly comprising an array of circular blades driven at a cutting speed, each of said circular blades including a cutting edge, said array of circular blades defining gaps therebetween, and said array of circular blades also defining a cylindrical cutting zone;

a plunger mounted on said frame, said plunger defining a plunger face and also defining an array of recesses therein positioned to accept insertion of said array of circular blades, said plunger moveable relative to said saw assembly from a first position to a second position, said first position being characterized by said plunger being disengaged from said array of circular blades wherein said plunger face is spaced apart from said cutting edges, said second position being characterized by said plunger being engaged with said array of circular blades wherein said array of circular blades is at least partially inserted within said array of recesses; and a plunger actuator for moving said plunger from said first position to said second position, such that said wood chips placed intermediate said plunger and said saw assembly may be pushed by said plunger into said cutting edges to create a plurality of cut wood chips within said gaps, and wherein said cut wood chips are pushed into and then completely through at least a portion of said cutting zone as said plunger reaches said second position, said plunger actuator further capable of returning said plunger from said second position to said first position, wherein said frame further defines a channel, said channel comprising a floor, a plurality of side walls, and a plurality of slots in said floor, said slots being located and sized such that said array of circular blades protrudes therethrough, and said plunger being configured to move within said channel toward said array of circular blades while pushing said wood chips within said channel.

39. An apparatus for processing a plurality of wood chips, comprising:

a frame;

a saw assembly comprising an array of circular blades driven at a cutting speed, each of said circular blades including a cutting edge, said array of circular blades defining gaps therebetween, and said array of circular blades also defining a cylindrical cutting zone;

a plunger mounted on said frame, said plunger defining a plunger face and also defining an array of recesses therein positioned to accept insertion of said array of circular blades, said plunger moveable relative to said saw assembly from a first position to a second position, said first position being characterized by said plunger being disengaged from said array of circular blades wherein said plunger face is spaced apart from said cutting edges, said second position being characterized by said plunger being engaged with said array of circular blades wherein said array of circular blades is at least partially inserted within said array of recesses; and a plunger actuator for moving said plunger from said first position to said second position, such that said wood chips placed intermediate said plunger and said saw assembly may be pushed by said plunger into said cutting edges to create a plurality of cut wood chips within said gaps, and wherein said cut wood chips are pushed into and then completely through at least a portion of said cutting zone as said plunger reaches said second position, said plunger actuator further capable of returning said plunger from said second position to said first position, wherein said plunger face further comprises a planar portion and an overhanging portion, said planar portion shaped to align said wood chips substantially parallel to said planar portion as said plunger moves from said first position to said second position, said overhanging portion shaped to contain said wood chips during cutting.

40. An apparatus for processing a plurality of wood chips, comprising:

a frame;

a saw assembly comprising an array of circular blades driven at a cutting speed, each of said circular blades including a cutting edge, said array of circular blades defining gaps therebetween, and said array of circular blades also defining a cylindrical cutting zone;

a plunger mounted on said frame, said plunger defining a plunger face and also defining an array of recesses therein positioned to accept insertion of said array of circular blades, said plunger moveable relative to said saw assembly from a first position to a second position, said first position being characterized by said plunger being disengaged from said array of circular blades wherein said plunger face is spaced apart from said cutting edges, said second position being characterized by said plunger being engaged with said array of circular blades wherein said array of circular blades is at least partially inserted within said array of recesses;

a plunger actuator for moving said plunger from said first position to said second position, such that said wood chips placed intermediate said plunger and said saw assembly may be pushed by said plunger into said cutting edges to create a plurality of cut wood chips within said gaps, and wherein said cut wood chips are pushed into and then completely through at least a portion of said cutting zone as said plunger reaches said second position, said plunger actuator further capable of returning said plunger from said second position to said first position; and a dam positioned above and adjacent said plunger, said dam being shaped to align said wood chips substantially parallel to said plunger face.

41. An apparatus for processing a plurality of wood chips, comprising:

a saw assembly comprising an array of circular saw blades mounted in a spaced-apart relationship on a common shaft, said shaft configured to rotate about its longitudinal axis;

a rotating paddlewheel-type feeder assembly positioned to accept an incoming flow of wood chips, said feeder assembly comprising a plurality of slotted chip sweepers fixedly connected to a central hub and extending generally radially therefrom, said hub mounted in such a manner as to permit rotation of said feeder assembly about an axis, said axis being located adjacent said common shaft in such a location as to permit the intersection of said plurality of slotted chip sweepers and said array of circular saw blades, said intersection allowed due to said slotted chip sweepers including an array of slots therethrough positioned to allow at least a portion of said array of circular blades to pass through said slots, such that as said feeder assembly is rotated about said axis, said slotted chip sweepers capture and urge said incoming wood flow of chips towards said array of circular blades, such that said feeder assembly feeds said wood chips into said array of circular blades and said wood chips are guided through and cut by said saw blades.

42. The apparatus for processing a plurality of wood chips as claimed in claim 41, wherein said slotted chip sweepers are scoop-shaped to facilitate scooping of said chips and guiding them through the saw blades.

* * * * *

UNITED STATES PATENT AND TRADEMARK OFFICE
CERTIFICATE OF CORRECTION

PATENT NO. : 6,575,066 B2  Page 1 of 1
DATED : June 10, 2003
INVENTOR(S) : Arasmith It is certified that error appears in the above-identified patent and that said Letters Patent is hereby corrected as shown below:

Column 11,
Line 55, after "from" insert -- a --;
Line 58, "plunge" should read -- plunger --.

Column 16,
Line 21, after "said", first occurrence, cancel "a".

Signed and Sealed this

Seventh Day of October, 2003

JAMES E. ROGAN
*Director of the United States Patent and Trademark Office*